United States Patent [19]

Foster

[11] 4,080,815

[45] Mar. 28, 1978

[54] PINCH AND FORMING ROLL ASSEMBLY FOR NUMERICALLY CONTROLLED CONTOUR FORMING MACHINES

[75] Inventor: Gene B. Foster, Seattle, Wash.

[73] Assignee: The Boeing Company, Seattle, Wash.

[21] Appl. No.: 756,359

[22] Filed: Jan. 3, 1977

Related U.S. Application Data

[63] Continuation-in-part of Ser. No. 584,776, Jun. 9, 1975, abandoned, which is a continuation of Ser. No. 525,584, Nov. 20, 1974, Pat. No. 3,906,765, which is a continuation-in-part of Ser. No. 383,374, Jul. 27, 1973, Pat. No. 3,854,215.

[51] Int. Cl.² ............................................. B21D 7/08
[52] U.S. Cl. ............................................. 72/168; 72/65; 72/173; 72/177
[58] Field of Search ......................................... 72/9–12, 72/166, 170, 173, 175, 371, 141, 168, 64, 127, 166, 85, 177, 176, 178, 182, 179

[56] References Cited

U.S. PATENT DOCUMENTS

| 469,763 | 3/1892 | Williams | 72/168 |
|---|---|---|---|
| 702,836 | 6/1902 | Weber | 72/168 |
| 2,348,185 | 5/1944 | Bartee | 72/178 X |
| 3,485,076 | 12/1969 | Colburn | 72/179 |

*Primary Examiner*—Milton S. Mehr
*Attorney, Agent, or Firm*—Christensen, O'Connor, Johnson & Kindness

[57] ABSTRACT

A pinch and forming roll assembly for a numerically controlled contour forming machine wherein a piece of material (part) having a preformed cross-sectional configuration is moved through pinch rolls located in between right and left hand forming rolls is disclosed. Each forming roll is position adjustable both laterally and separationwise with respect to the pinch roll along two longitudinal axes. In addition, each forming roll is position adjustable along two rotational axes. Adjustment is provided by rotatably mounting each forming roll in a position adjustable yoke. The yokes are adapted to swivel about an axis running orthogonally through the centerline defined by the rotational axis of the relative forming roll. In addition, each yoke has a semispherical outer surface that is position adjustable. Further, each yoke is supported by a mechanism that allows it to be position adjusted along two orthogonal longitudinal axes. In addition, a rotating shoe assembly is provided for pressing the part to be contour formed tightly against the forming rolls. Moreover, the pinch rolls are position adjustable in a manner such that they can change the leg angularity of a part, or its thickness in certain regions, if desired.

32 Claims, 37 Drawing Figures

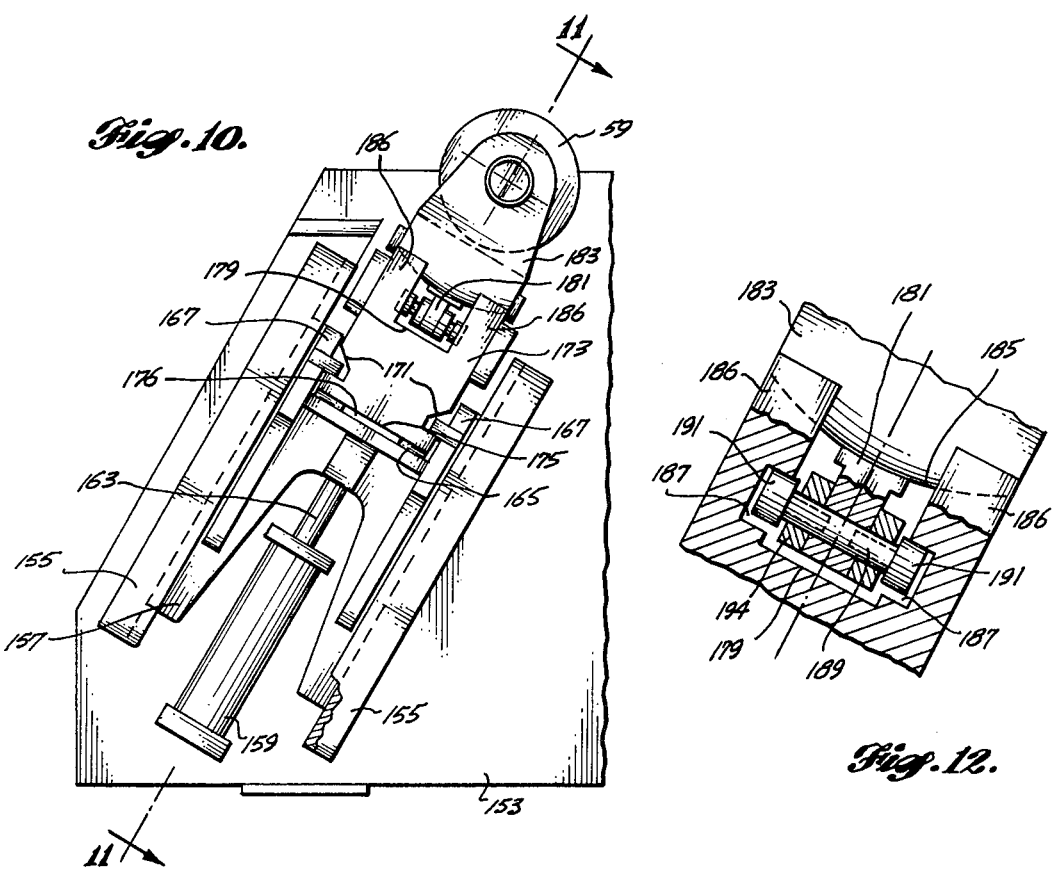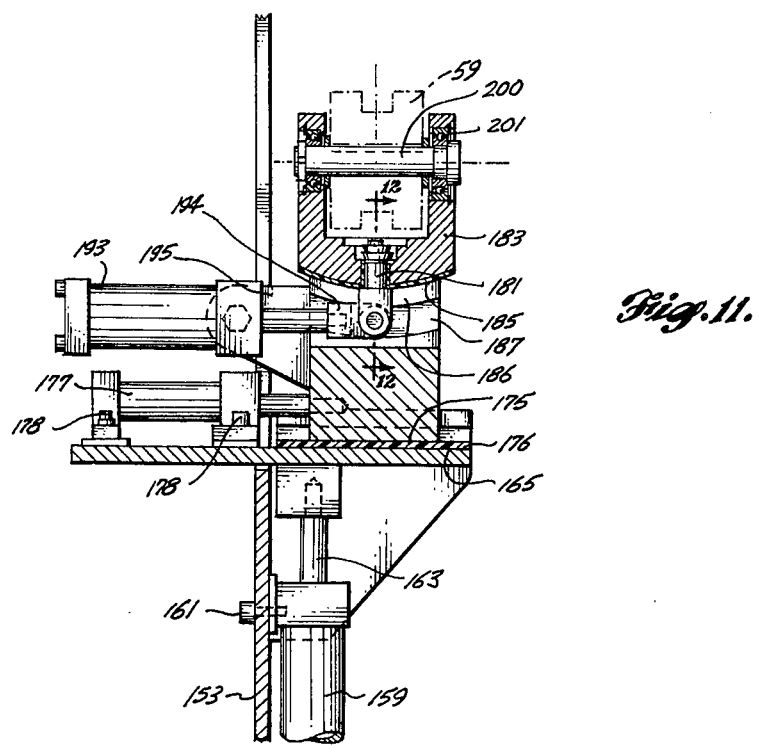

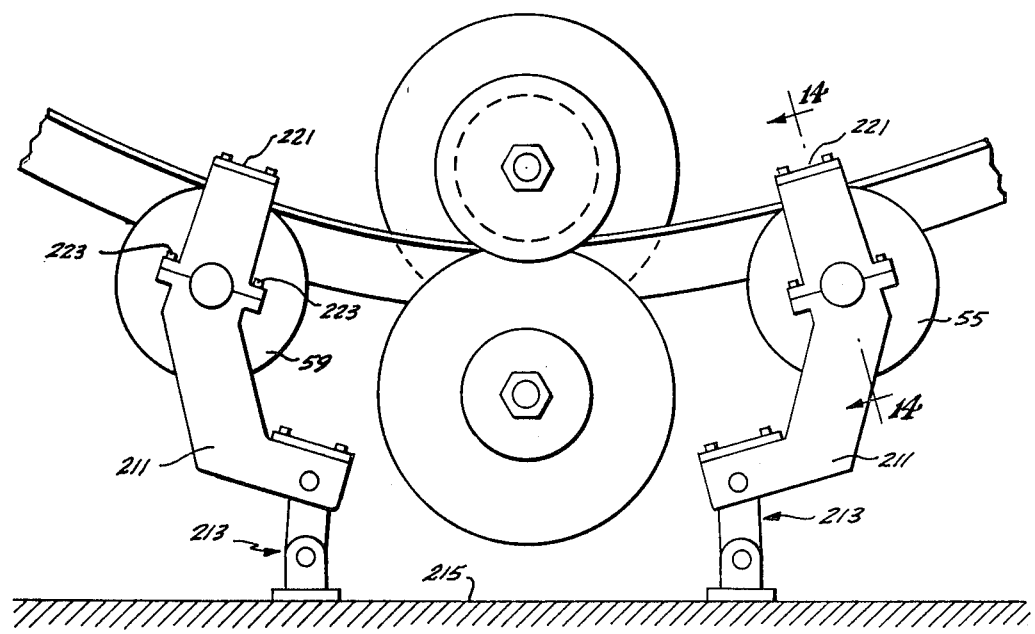
Fig. 13.
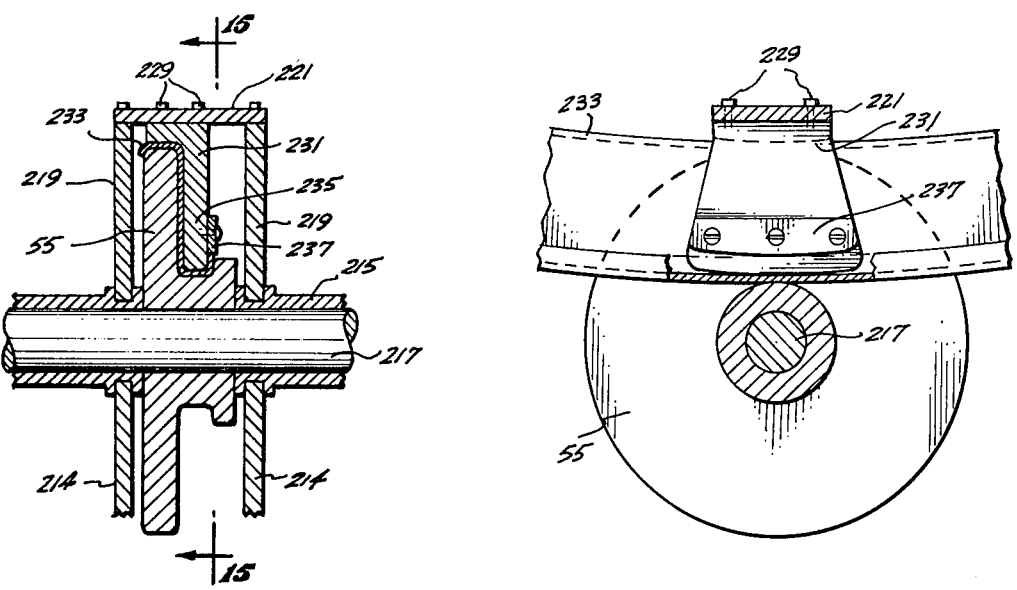
Fig. 14.
Fig. 15.

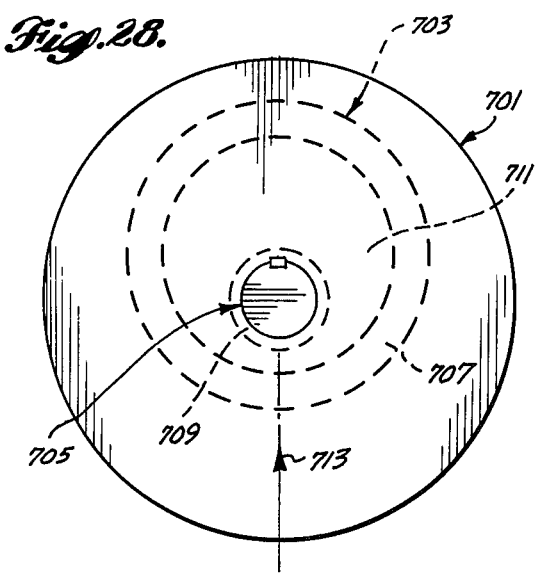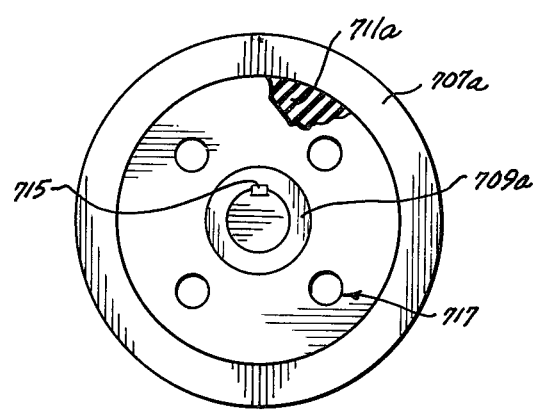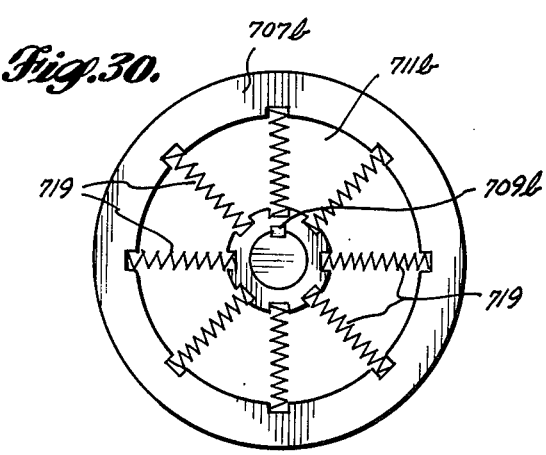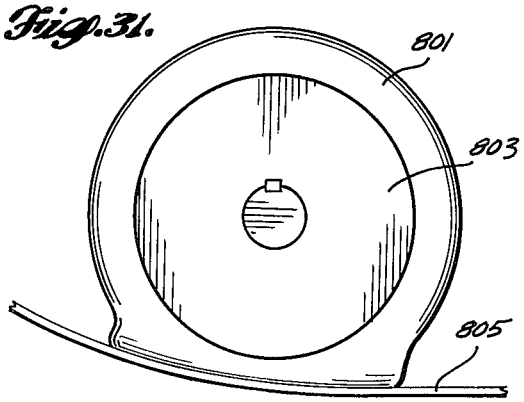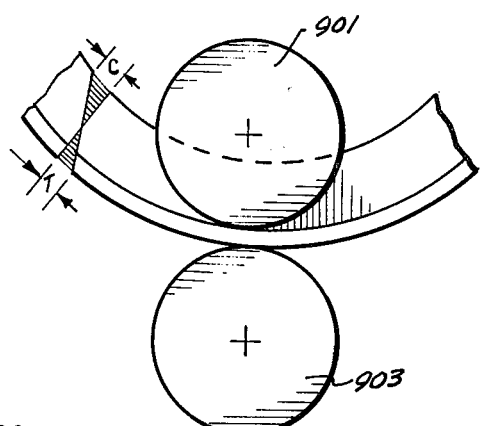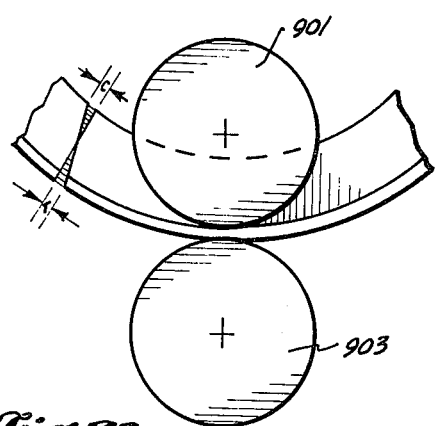

//4,080,815//

PINCH AND FORMING ROLL ASSEMBLY FOR NUMERICALLY CONTROLLED CONTOUR FORMING MACHINES

RELATIONSHIP TO OTHER APPLICATIONS

This application is a continuation-in-part of application Ser. No. 584,776, filed June 9, 1975, now abandoned, which in turn is a continuing application of application Ser. No. 525,584, filed Nov. 20, 1974, now U.S. Pat. No. 3,906,765, which, in turn, is a continuation-in-part of application Ser. No. 383,374, filed July 27, 1973, now U.S. Pat. No. 3,854,215. The benefits of the filing dates of these applications are claimed under 35 U.S.C. 120.

BACKGROUND OF THE INVENTION

This invention is directed to numerically controlled machines and, more particularly, to machines directed to the contour and other forming of extruded and sheet metal parts.

Contour forming machines for forming contours in extruded and sheet metal structural elements or parts, such as body frames, stiffeners and stringers used in aircraft, for example, fall generally into two classes—stretch forming machines and roll forming machines.

Stretch forming machines cause the parts to yield under tension while being maintained in a plastic state. The parts are wrapped against a form block of the desired contour until the desired part contour is achieved. Because an individual form block is required for each part, stretch forming has the disadvantage of requiring considerable lead time for form block fabrication and testing. With most high-strength materials, springback factors must be experimentally developed and incorporated into the form block contour. In addition to the expense attendant to developing individual form blocks, and the considerable lead time involved, stretch forming has the further disadvantage of requiring the maintenance and storage of an expensive inventory of large, fairly complex tools. Moreover, stretch forming has the mechanical disadvantage that when a part is formed in tension it has a strong tendency to thin and neck, thus losing structural strength. In order to avoid this tendency, filler blocks and a variety of elongation control devices are frequently employed, all of which further increase the cost of contour forming using this process.

In roll forming machines a part is traversed through an arrangement of rolls that are progressively offset to impart increasing contour. The operator of the roll forming machine continues to increase the contour of the part by adjustment of the rolls until he determines, through frequent reference to a template or checking fixture, that the desired contour configuration has been achieved. Because only a small increment of the part is formed at a time, and because the geometric arrangement of the rolls provides a considerable leverage factor, roll forming facilities are smaller than comparable stretch forming facilities. Moreover, roll forming machines are considerably less expensive than corresponding stretch forming machines. However, classically, only uniplanar contours, as opposed to multiplanar contours, have been formed using roll facilities. One of the reasons only uniplanar contours, as opposed to multiplanar contours, have in the past been formed using roll forming facilities relates to the mechanism for controlling the position of the forming rolls. Generally this mechanism has only moved the forming roll along a single axis readily controlled by operator skill. Obviously, single axis control will, in general, prevent multiplanar contours from being formed using the forming mechanism of a roll forming machine. Another problem with roll forming machines utilized by the prior art relates to their inability to readily contour form parts with complex cross sections. Since many parts that must be contour formed have complex cross sections, this limitation, obviously, limits the usefulnes of such roll forming machines.

A further limitation of prior art roll forming machines in their inability to change part cross-sectional shape as a part is being contour formed. For example, they have not been used to vary the angularity of the leg of a T-shaped part as it is being contour formed.

Therefore, it is an object of this invention to provide a new and improved contour forming machine.

It is a further object of this invention to provide a contour roll forming machine wherein the forming rolls are position adjustable about more than one axis.

It is a still further object of this invention to provide a new and improved mechanism for positioning the forming rolls of a roll forming machine about a variety of axes.

It is a still further object of this invention to provide a roll forming machine including a mechanism that allows the roll forming machine to readily contour form parts with complex cross sections.

It is yet another object of this invention to provide a roll forming machine suitable for varying the cross-sectional configuration of a part as it is being contour formed.

It is still another object of this invention to provide a roll forming machine suitable for varying the thickness of selected region of a part as it is being contour formed.

SUMMARY OF THE INVENTION

In accordance with principles of this invention, a pinch and forming roll assembly is provided. The assembly comprises a pair of pinch rolls located between right and left hand forming rolls. At least one forming roll is position adjustable both laterally and separationwise with respect to the pinch rolls. In addition, preferably, the at least one adjustable forming roll is rotationally adjustable along one or more rotational axes. The adjustment of the at least one position adjustable forming roll is such that a part passing through the assembly is uniplanar or multiplanar contoured in a desired manner.

In accordance with further principles of this invention, each forming roll is position adjustable and is rotatably mounted in a position adjustable yoke. The yokes are adapted to swivel about an axis running orthogonally through the centerline defined by the rotational axis of the related forming roll. In addition, each yoke has a semi-spherical outer surface that is position adjustable; further, each yoke is supported by a mechanism that allows it to be position adjusted along two orthogonal longitudinal axes.

In accordance with still further principles of this invention hydraulic actuators are mounted such that the position adjustable yokes are power position adjustable. Further, position sensors are provided and mounted so as to provide an indication of the position of the yokes and, thus, the forming rolls about their adjustable axes.

In accordance with yet other principles of this invention, a rotating shoe assembly is provided for pressing the part to be contour formed tightly against the forming rolls. Further, the pinch rolls are position adjustable in a manner such that they can change the leg angularity of a part, as the part is being contour formed, if desired. Or, leg angularity can be changed without the part being contoured, if desired. In this regard, preferably, the upper pinch roll is vertically position adjustable; and, a position sensor, adapted to sense the position of the upper pinch roll and provide an indication thereof, is mounted adjacent to the upper pinch roll.

It will be appreciated from the foregoing brief summary that the invention provides a pinch and roll forming assembly for a contour forming machine. Preferably the contour forming machine is numerically controlled and has the advantages of prior art manually operated roll forming machines without the disadvantages theeof, i.e., the invention can multiplanar contour form parts with complex cross-sections. Multiplanar contour forming results from the ability to position the forming rolls about a multitude of axes. Complex cross-section forming is primarily the result of the rotating shoe assembly. Leg angularity variations and selected cross-sectional variations result from the ability to control the position of at least one of the pinch rolls. The invention will provide production products equal to or better than those formed using stretch forming techniques without requiring that an expensive inventory of tools be maintained. This, the invention overcomes the previously discussed disadvantages of both stretch and roll contour forming systems.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 10 is a front view illustrating a mechanism for positioning the left hand forming rolls;

FIG. 11 is a cross-sectional view along line 11—11 of FIG. 10;

FIG. 12 is a fragmentary cross-section view along line 12—12 of FIG. 11.

FIG. 13 is a schematic diagram illustrating a shoe assembly adapted to press the part to be formed tightly against the forming rolls;

FIG. 14 is a cross-sectional view along line 13—13 of FIG. 13;

FIG. 15 is a cross-sectional view along line 15—15 of FIG. 14;

FIG. 28 is a plan view illustrating a portion of a pinch roll segment laterally movable with respect to the axis of rotation of the pinch roll;

FIG. 29 is a plan view of a preferred embodiment of a movable segment of a pinch roll formed in accordance with the invention;

FIG. 30 is a plan view of an alternate embodiment of a movable segment of a pinch roll formed in accordance with the invention;

FIG. 31 is a plan view of a further embodiment of a movable segment of a pinch roll formed in accordance with the invention;

FIG. 32 is a pictorial plan view illustrating the compression/tension stress that occurs when a part with a sharp radius of curvature is being formed; and FIG. 33 is a pictorial plan view illustrating the reduced compression/tension stress that occurs when the thickness of a selected region of a part is reduced as a part with a sharp radius of curvature is being formed.

DESCRIPTION OF THE PREFERRED EMBODIMENTS

Figure 1:
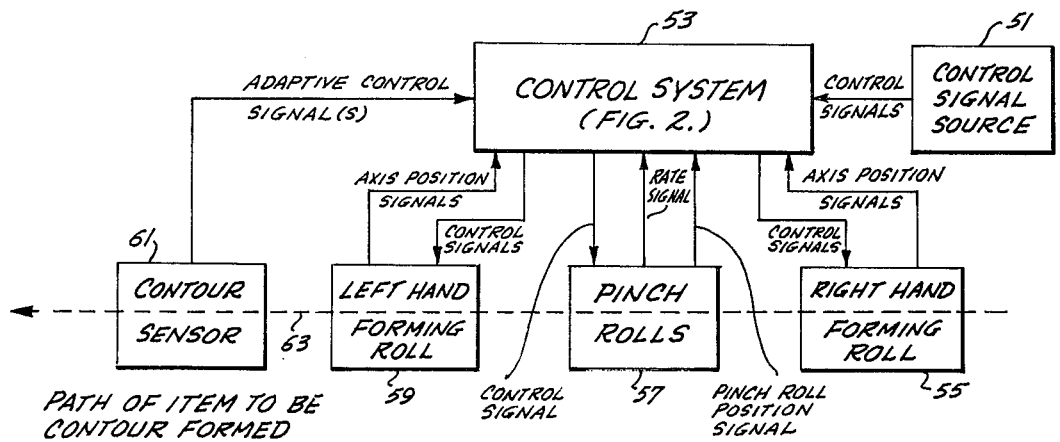
FIG. 1 is a block diagram illustrating a numerical control system for controlling the contour forming mechanism of the invention.

FIG. 1 is a block diagram illustrating a numerically controlled contour forming machine and comprises: a control signal source 51; a control system 53; a right hand forming roll 55; pinch rolls 57, a left hand forming roll 59; and, a contour sensor 61.

The control signal source 51 generates a plurality of control signals and applies them to the control system 53. The control signal source could, for example, be a reader for reading punched or magnetic tape. Alternatively, the control signal source could be a memory, which stores manually inserted control signals and outputs them as needed.

The control system 53 also receives: axis position signals related to the position of the right and left hand forming rolls with respect to zeroing points along each axis along which they can be positioned; a rate signal from the pinch rolls which designates the rate of movement of the part to be contour formed through the machine along the path of travel designated by dashed line 63; and, a pinch roll position signal related to the vertical position of the upper pinch roll, if the leg angularity or thickness of the part being contour formed is to be changed. Further, the control system 53 receives adaptive control signals from the contour sensor 61. If the contour sensor is a uniplanar sensor, a single output signal is generated and utilized by the control system. Alternatively, if the sensor is a multiplanar sensor of the type described in U.S. Pat. No. 3,854,215, filed July 27, 1973, by Gene B. Foster for "Multiplanar Sensor and Control System for Use in Roll Forming Machines," then a multitude of signals form the adaptive control signal. With respect to U.S. Pat. No. 3,854,215, the information contained therein, particularly the information related to the illustrated and described multiplanar sensor, is incorporated herein by reference. Regardless of the type of sensor, the control system utilizes information sensed by the contour sensor to modify the control signals it applies to the right and left hand forming rolls 55 and 59.

Figure 2:
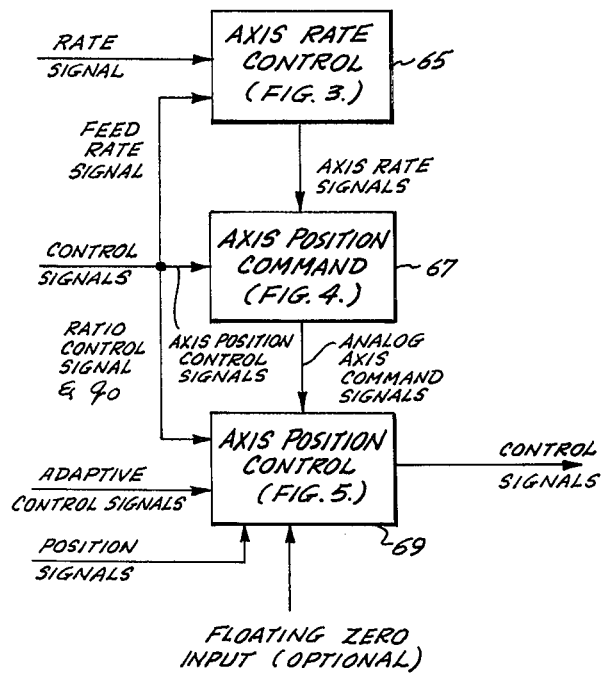
FIG. 2 is a block diagram of a control system suitable for use in the numerical control system illustrated in FIG. 1 to control the position of the forming rolls.

FIG. 2 is a block diagram illustrating in somewhat more detail a control system suitable for use in the numerical control system illustrated in FIG. 1 to control the position of the forming rolls and, comprises: an axis rate control 65; an axis position command 67; and, an axis position control 69. The rate signal received from the pinch rollers 57, which may be generated by a shaft encoder, for example, is received by the axis rate control 65. In addition, the axis rate control receives a feed rate signal from the control signal source 51. In accordance therewith, the axis rate control applies axis rate signals to the axis position command 67. The axis rate signals control the rate of movement of the right and left hand forming rolls 55 and 59 along their various axes of movement in the manner herein described.

The axis position command 67, in addition to receiving the axis rate signals, also receives axis position control signals from the control signal source 51. In accordance therewith, the axis position command 67 generates analog axis command signals and applies them to the axis position control 69. The analog axis command signals are adapted to control the movement of the right and left hand forming rolls 55 and 59 along their various axes, subsequent to the analog axis command signals being modified by the axis position control 69.

The axis position control 69, in addition to receiving the analog axis command signals, also receives the adaptive control signal or signals generated by the contour sensor 61 and position signals generated by suitable sensors (e.g. potentiometers) positioned so as to sense the position of the right and left hand forming rolls along the various controlled axes hereinafter described. Further, the axis position control 69 receives a ratio control signal and a $q_0$ signal for each axis from the control signal source. The significance of the ratio control signal and the $q_0$ signal will be better understood from the following description of an axis position control 69.

Figure 3:
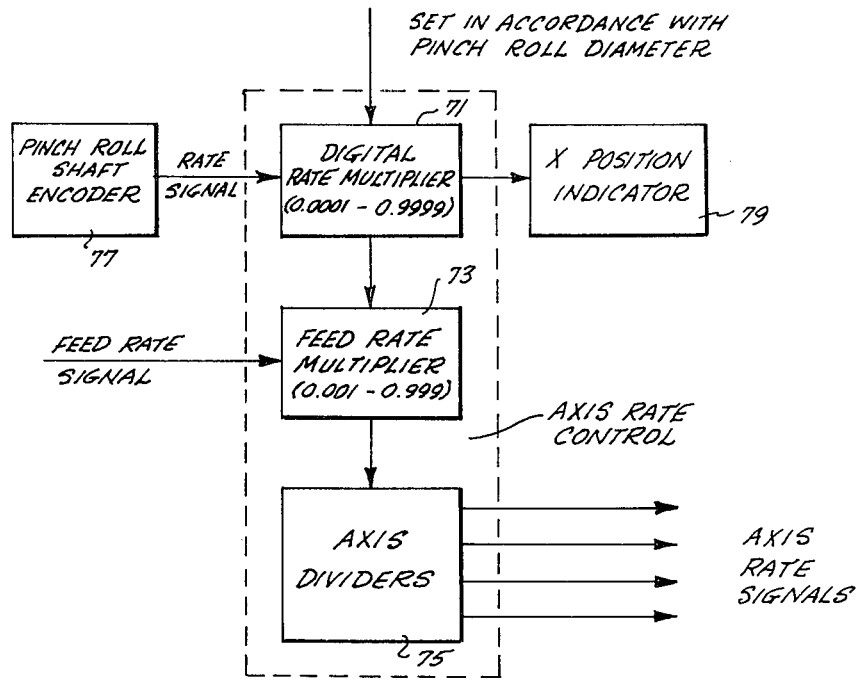
FIG. 3 is a block diagram of an axis rate control suitable for use in the control system illustrated in FIG. 2.
Figure 7:
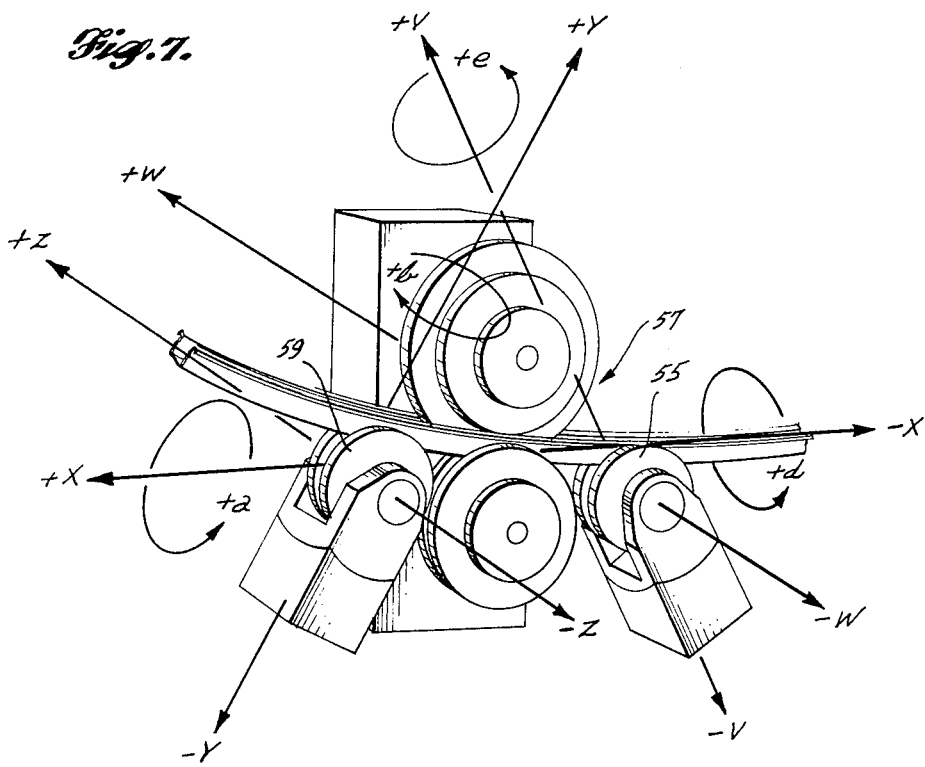
FIG. 7 is a schematic diagram illustrating the difference movement axes of the right and left hand forming rolls.

FIG. 3 is a block diagram illustrating an axis rate control suitable for use in the control system illustrated in FIG. 2 and comprises: a digital rate multiplier 71; a feed rate multiplier 73; and, axis dividers 75. In addition, FIG. 3 illustrates a pinch roll shaft encoder 77 adapted to generate the rate signal received by the axis rate control 65 and a position indicator 79 adapted to indicate the position of the part being contour formed as it moves through the contour forming mechanism of the invention. In this regard, as illustrated in FIG. 7 and more fully described hereinafter, the position of the part at any particular point in time is defined as its position along the X-axis, with the X-axis being defined as the longitudinal part centerline when the right and left hand forming rolls are aligned with the center of the pinch rolls.

As noted above, the pinch roll shaft encoder 77 generates a rate signal. The rate signal is applied to the digital rate multiplier 71 which is set in accordance with the diameter of the pinch rollers. Preferably, the rate of multiplication varies between 0.0001 and 0.9999, depending upon the specific diameter of the pinch rolls. The digital rate multiplier is preferably adjusted so that it outputs one pulse per 0.001 inch of part travel. This adjustment is determined from the following formula: C = 1000 D/R; where: C equals the calibration (multiplication) factor; D equals the diameter of the encoder related pinch roll in inches; and, R equals the pulse rate of the pinch roll shaft encoder in pulses per second. Thus, if the encoder, for example, generates 36,000 pulses per revolution and the diameter of the pinch roll is 10.5 inches, the digital rate multiplier is set to multiply by a factor of 0.9163, assuming the maximum rate of revolution of the pinch rollers is 10 revolutions per minute.

The output of the digital rate multiplier is applied to the position indicator, which includes an accumulator for accumulating the number of pulses generated and a display for displaying the accumulated total. In addition, the digital rate multiplier output is applied to the feed rate multiplier 73.

The feed rate multiplier also receives a feed rate signal generated by the control signal source 51. The feed rate signal is, in effect, a limiting signal determined by the parameters of the N/C contour machine being controlled. More specifically, each such machine has certain limits on the rate at which its forming rolls can be moved along each axis of movement. Thus, depending on the desired contour, one axis sets the limit for all axes of movement. The feed rate signal forms an input that limits forming roll axis movement to this maximum value.

Thus, the feed rate multiplier reduces the output of the digital rate multiplier to a level such that it can be utilized through the axis dividers to move the right and left hand forming rolls along their various axes of movement in a manner such that the rolls reach the desired position along the various axes all at the same time and in the most rapid manner, which manner is generally controlled by the rate limit of one axis, the axis being determined by the particular part contour desired. Preferably, the feed rate multiplier multiplies the output of the digital rate multiplier by a factor lying in the range of from 0.001 to 0.999.

The output of the feed rate multiplier is applied to the axis dividers 75 where it is divided either by a suitable chain of digital dividers or by a plurality of separate dividers. In either case, the dividers may be either preset or controlled by the control signal source, as desired. The axis dividers 75 divide the digital output of the feed rate multiplier to levels suitable for controlling the rate of forming roll movement along each controlled axis. The axis rate signals are, as illustrated in FIG. 2 and noted above, applied to an axis position command, preferably formed of a plurality of circuits of the type illustrated in block form in FIG. 4.

At this point it will be appreciated that the axis rate control provides rate control signals that control the rate of movement of the right and left hand forming rolls along their various axes of movement so that coordinated movement occurs, whereby desired positions are simultaneously reached, and no time lag exists between the time one position is reached and other positions are reached. If the position of one of the pinch rolls, e.g., the upper pinch roll, is also controlled as hereinafter described, the axis rate control also produces a rate control signal adapted to control the rate of movement of the position controlled pinch roll.

Figure 4:
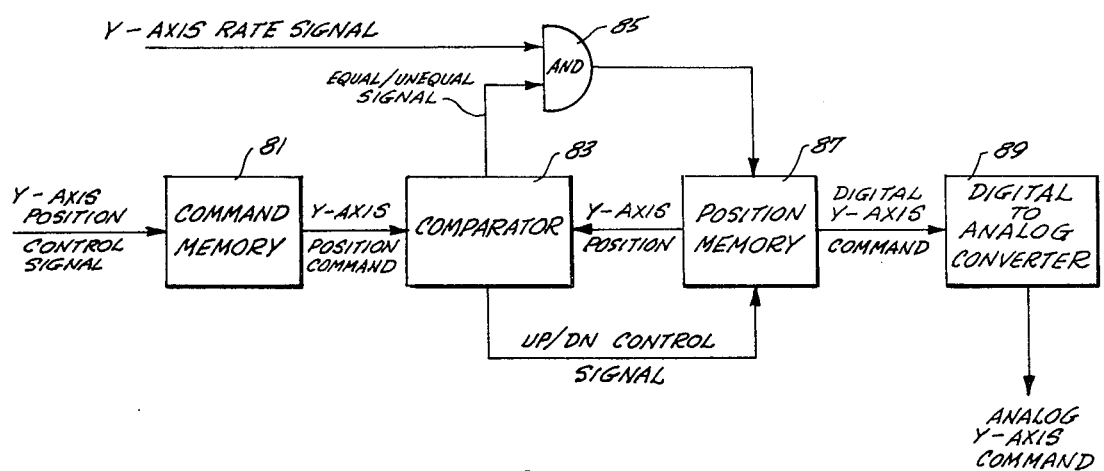
FIG. 4 is a block diagram of an axis position command suitable for use in the control system illustrated in FIG. 2.

FIG. 4 is a block diagram illustrating an axis position command circuit suitable for use in the control system illustrated in FIG. 2. It is pointed out here that, as noted above, an axis position command circuit of the type illustrated in FIG. 4 is needed for each axis to be controlled, whereas only a single axis rate control of the type illustrated in FIG. 3 is needed. For purposes of discussion only, the axis position command circuit is illustrated as adapted to control the Y-axis of movement, as that axis is hereinafter defined.

The position command 67 illustrated in FIG. 4 comprises: a command memory 81; a comparator 83; an AND gate 85; a position memory 87; and, a digital-to-analog converter 89. The Y-axis rate signal output of the axis divider 75 is applied to one input and the AND gate 85. In addition, the Y-axis position control signal, generated by the control signal source 51, is applied to the command memory 81. More specifically, control signal blocks are sequentially generated by the control signal source on an intermittent basis using well known digital data processing equipment. The data contained in these control signal blocks is first entered into a suitable buffer memory (not shown). As the information contained in each control signal block is needed, the data is transferred from the buffer memory to the command memory, utilizing a timing system not illustrated for purposes of clarity. The data contained in the command memory represents a Y-axis position command.

The comparator compares each new Y-axis position command stored in memory with the actual Y-axis position as recorded in the position memory 87. If the commanded and actual positions are unequal, the comparator originates two signals. One signal is an UP/DN control signal and is applied to the position memory to indicate the direction in which the position of the forming roll along the Y-axis is to change, i.e. up or down with respect to the position memory. If is printed out here that the position memory is a pre-programed memory wherein each programmed memory position designates a Y-axis position. The position memory could for example be a solid state read only memory(ROM).

The second output of the comparator is an equal/unequal signal andis applied to the second input of the AND gate 85. When the comparator determines that the position command and actual position signals are unequal this output enables the AND gate 85. An equal determination disables the AND gate. When enabled, the AND gate passes the Y-axis rate signal, which is a pulse train. This pulse train causes the position memory to move "up" or "down" as directed by UP/DN control signal, i.e., the position memory is searched at the Y-axis rate signal pulse rate and in a direction determined by the result of the comparison. As the position memory is searched, it outputs a series of Y-axis digital commands. These digital commands are received by the digital-to-analog converter 89 and converted to analog Y-axis commands. The analog Y-axis commands are applied to an axis position control 69 of the type illustrated in FIG. 5 and hereinafter described.

In summary, it will be appreciated from viewing FIG. 4 and the foregoing description that as long as the related forming roll is positioned at the correct point along the related axis, the comparator will generate an "equal" output and no up/down control signal. Thus, the AND gate 85 will not be enabled. When the forming roll position along the appropriate axis is to be changed, an unequal output, which enables the AND gate 85, is generated. If the new position is "up" from the present position, an "up" control signal is applied to the position memory 87. Alternatively, if the new position is "down" from the previous position, a "down" control signal is applied to the position memory 89. Since the AND gate 85 is enabled, the Y-axis rate pulses are also applied to the position memory 87. In accordance with the Y-axis rate signal pulse rate, the position memory generates Y-axis digital commands. The digital commands, in turn, create analog Y-axis commands adapted to cause movement of the appropriate forming roll along the appropriate axis. Prior to such movement, however, the analog Y-axis commands are modified, as necessary, in the manner hereinafter described.

Figure 5:
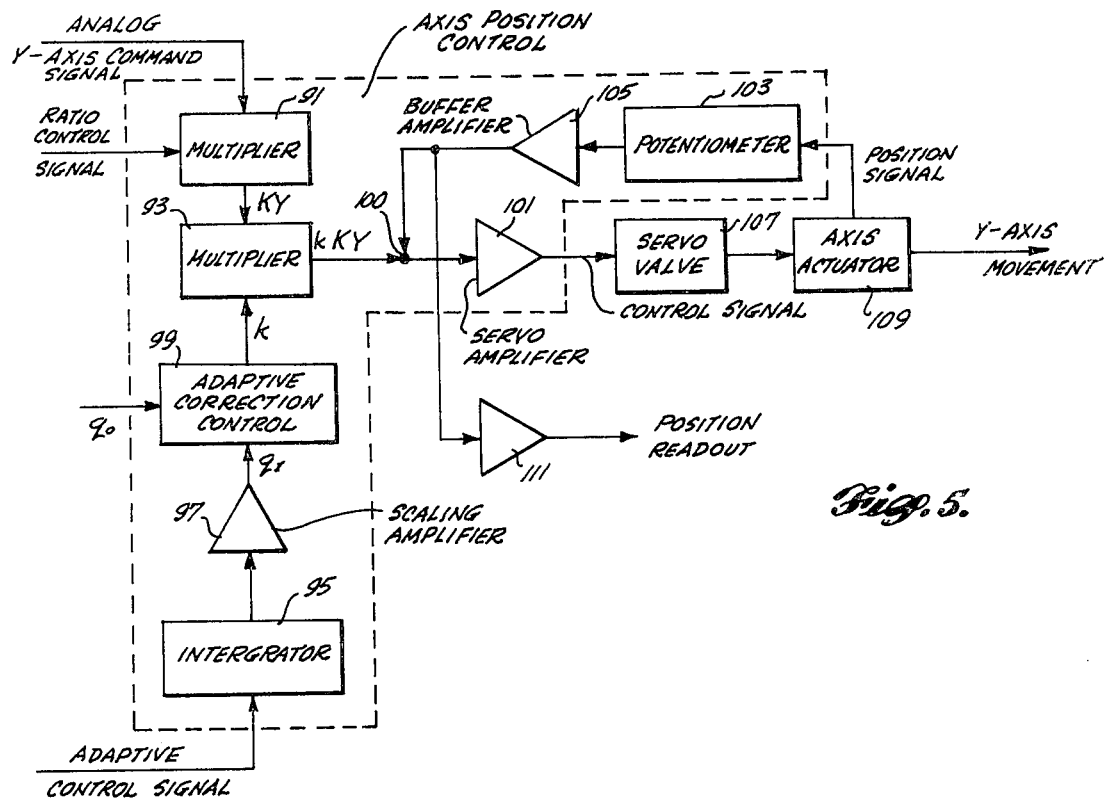
FIG. 5 is a block diagram of an axis position control suitable for use in the control system illustrated in FIG. 2.

FIG. 5 is a block diagram illustrating an axis position control suitable for use in the control system illustrated in FIG. 2. As with the axis position command 67, an axis position control 69 is needed for each axis to be controlled. The axis position control 69 illustrated in FIG. 5 comprises: a first multiplier 91; a second multiplier 93; an integrator 95; a scaling amplifier 97; an adaptive correction control 99; a servo amplifier 101; a potentiometer 103; and, a buffer amplifier 105. FIG. 5 also includes: a servo valve 107; an axis actuator 109; and, a position readout amplifier 111.

The analog Y-axis command signal is applied to one input of the first multiplier 91. A ratio control signal related to the Y-axis is applied to the second input of the multiplier 91. The ratio control signal is generated by the control signal source 51. The ratio control signal increases the gain in the axis loop (the Y-axis loop in the illustrated circuit) by an infinitely variable factor lying within a predetermined range, from one to three, for example. The ratio control signal provides for rough springback control by causing the part to be overbent. More specifically, the analog axis command represents a desired contour. Most parts, when contour formed, will "springback" to some degree after they exit from the last forming roll. The amount of springback can be predicted, within a broad range, depending on the nature of the material and the radius of the contour along the axis being controlled. The ratio control signal is a multiplication value that compensates for springback within the predictable range. Fine or vernier springback compensation is provided by the adaptive control portion of the axis position control in the manner hereinafter described. The output of the first multiplier 91 is designated KY and is applied to one input of the second multiplier 93.

The adaptive control signal related to the controlled (Y) axis is applied to the input of the integrator 95. The integrator is a variable step integrator that prevents sensed contour variations generated by extraneous sources from affecting the system, thereby improving system stability. The integrator achieves this result by averaging sensed contour values over selectable part increments, rather than supplying instantaneous readings reflecting all minor inconsistencies in the part.

The output of the integrator 95 is amplified by the scaling amplifier 97 and applied to one input of the adaptive correction control 99. This input is designated $q_1$. The adaptive correction control receives a second input designated $q_0$. $q_0$ is a contour reference value signal generated by the control signal source 51. This signal is calculated from desired part geometry and designates what the expected output of the sensor should by at any particular point in time. The adaptive correction control computes an output signal designated k in accordance with the algorithm:

$$k = k_0 + [q_1/q_0 - 1]$$

where $q_0$ and $q_1$ are as indicated above, and $k_0$ equals the initial or preceding correction factor. Thus, the adaptive correction control 99 includes a memory which stores and continuously generates a correction factor signal, said signal being changed each time a change in the correction factor is calculated.

Obviously, contour reference values ($q_0$) provided by the control signal source 51 are offset by an increment equal to the transport delay in the system, i.e., the time required for the contoured part to reach the contour sensor 61. Thus, the contour reference values ($q_0$) come on line at the time the corresponding part increment reaches the sensor and is measured.

Initially, the adaptive correction control computes the $q_0/q_1$ ratio. If no previous correction factor is recorded in its memory, $q_0/q_1$ is used as the initial correction. If a $k_0$ is present in memory, $[q_1/_0 - ]$is is added to $k_0$ in accordance with the above algorithm. The new correction factor, k, is applied to the next block or active commands as a multiplication factor. More specifically, the second multiplier 93 multiplies Ky by k to produce a Y-axis command output designated kKY. Obviously, a k having a value larger than unity increases KY while a k having a value smaller than unity decreases KY. The adaptive correction control 99 continues to calculate new k values until $q_0$ equals $q_1$. When this condition occurs the desired part contour is being created. The last value of k is retained as the appropriate factor for the remaining part length, and for succeeding parts (if recorded for future use), unless subsequent changes in contour require the development of a new k value.

Figure 6:
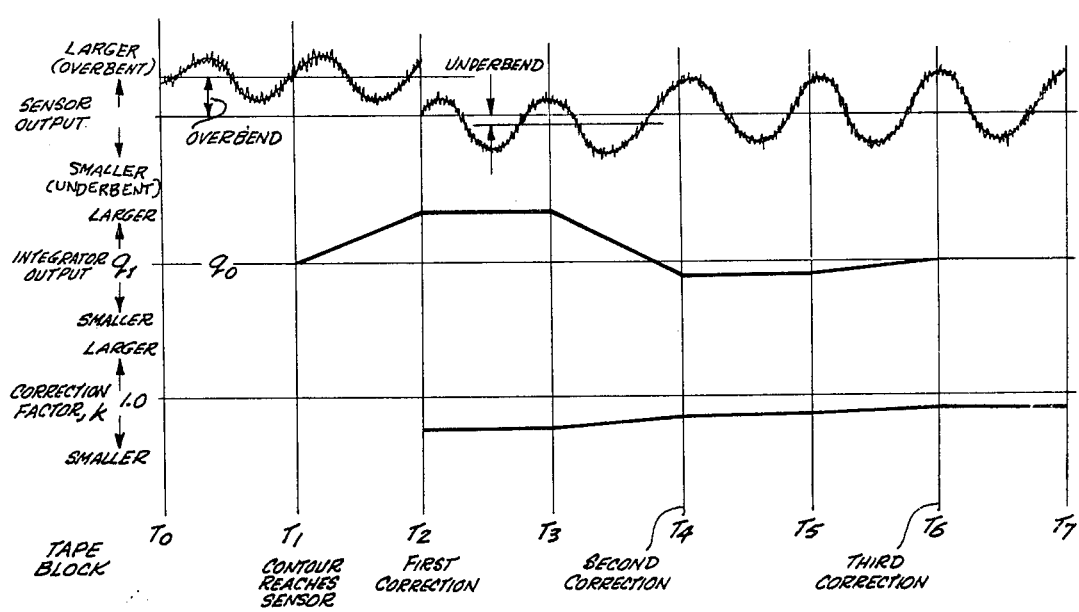
FIG. 6 is a waveform diagram utilized to describe the operation of the adaptive correction control mechanism.

FIG. 6 illustrates the operation of the adaptive correction control 99 through a three-step sequence of operation. The first line of FIG. 6 illustrates the output of the sensor along the axis of interest; the second line illustrates the output of the integrator ($q_1$); and, the third line illustrates the correction factor (k). During the initial time interval $\Delta T$ (from $T_0$ to $T_1$), the contoured portion of the part has not reached the sensor. Therefore there is no sensor output. During this period $q_1$ equals zero. Between $T_1$ and $T_2$ a contoured area of the part reaches the sensor and the integrator generates a ramp output relating to the overbent condition of the part, and the first correction factor is calculated. At $T_2$, a correction factor k is applied to the second multiplier 93 and causes a slight underbend. Between $T_2$ and $T_3$ overbent material is still being sensed and no change in k occurs. At $T_3$ underbent material reaches the sensor and between $T_3$ and $T_4$ this new trend is integrated and a new k created to correct in the opposite direction. At $T_4$ the new k is applied to the multiplier 93; however, the new k is somewhat inadequate. Between $T_5$ and $T_6$ another new k is calculated and applied. At $T_7$, $q_0 = q_1$ and the last calculated k continues to be generated, unless subsequent contour or material changes cause an underbend or overbend condition to develop. If such a condition does develop, the cycle is repeated and a new k is calculated.

While not illustrated, preferably, an adaptive control range limiter is incorporated in the system illustrated in FIG. 5 to prevent unusually large extraneous signal variations from causing an erroneous k to be calculated. The range limiter is connected in series with the integrator and set to limit the sensor signal to some level. In this manner, any spikes created by large sporadic contour errors are ignored.

The output of the second multiplier (kKY) is applied to one input of a summing junction 100. The output of the summing junction 100 is connected to the input of the servo amplifier 101. The output of the servo amplifier 101 is applied to the servo valve 107. The servo valve 107 operates a hydraulic axis actuator 109. The hydraulic axis actuator 109 in turn causes Y-axis movement. In addition, the hydraulic axis actuator 109 controls the position of the movable element of the potentiometer 103. Thus, the potentiometer acts as an axis position indicator.

The output of the potentiometer, which is related to the position of the axis actuator which in turn is related to the position of the related forming roll along the Y-axis, is applied to input of the buffer amplifier 105. The output of the buffer amplifier 105 is connected to the second input of the summing amplifier 100 and to the input of the position amplifier 111. The output of the position amplifier 111 is a position readout signal and is applied to a suitable position readout display (not shown).

It will be appreciated by those skilled in the art and others that the axis position control illustrated in FIG. 5 is a closed loop servo system. The summing junction 100 compares the kKY signal with the output of the potentiometer, which represents the actual position of the forming roll along the axis being commanded—in this case the Y-axis. The corrected analog Y-axis command ($kKY$) may vary, for example, from 0 to $+10$ volts, and the potentiometer output may vary from 0 to $-10$ volts. When these signals are unequal in absolute value, an error signal equal to the difference between the two voltages is produced. The polarity of the error signal is related to the direction that the axis actuator must move to drive the error signal to zero.

The servo amplifier 101 receives the error signal and outputs a current proportional to the error. This current is transmitted to the torque motor of the servo valve, causing the spool thereof to shift in accordance with the current level and polarity, as is well known in the N/C machine tool art. As the servo valve changes position, hydraulic fluid causes axis actuator movement. The potentiometer monitors the position of the forming roll along the Y-axis as it is changed by the axis actuator. The potentiometer signal is continuously fed back to the summing junction where it is compared to the corrected Y-axis analog command ($kKY$). As the controlled (Y) axis approaches the desired forming roll position, the error signal drops toward zero and the current level applied to the servo valve of the torque motor reduces causing the valve spool to shift toward its center (closed) position. When the sensed axis position becomes equal to the desired position, the summing junction input voltages are of equal value, but opposite in polarity. Thus, the output of the summing junction 100 is zero. Because this output is zero, the servo valve is nulled and axis motion stopped. The servo loop maintains the forming roll in this axis position until such time as a new block of position control signals commands a position change. Maintaining of the forming roll axis position is accomplished, preferably, by metering small amounts of fluid to the actuator as required to compensate for leakage and any mechanical deflection that occurs.

It is pointed out that while all of the subsystem components illustrated in FIG. 5 are useful in controlling contour controlled axes of movement (i.e., the forming roll axes of movement), some components are not useful in controlling the position of a position controllable pinch roll. Specifically, since adaptive control signals usually will not be produced for leg angularity or thickness changes, because springback is likely to be reasonably constant and better handled using manual input corrections. Hence, the components related to the adaptive correction control will usually not be included in the electronic branch adapted to control the position of a pinch roll.

The description thus far has described an electronic control system for controlling the movement of the pinch or forming rolls of a contour roll forming machine along various axes and is useful to an understanding of the roll forming mechanism of the invention. FIG. 7 illustrates schematically the various contour axes which can be controlled, if desired. Obviously, in some environments only one or two of these axes will be controlled, as opposed to the eight that are illustrated.

As noted above, the X-axis is the main reference axis and is defined as the axis along which the part centerline moves when the right and left hand forming rolls are aligned with the pinch rolls. In addition to this axis, FIG. 7 illustrates four forming roll axes of motion for each of the forming rolls. These eight axes are defined as follows:

Left Hand Forming Roll

Y-axis—vertical movement of the left hand forming roll along a line either parallel to the vertical centerline between the pinch rolls or inclined thereto (the axis is illustrated as inclined).

Z-axis—lateral movement of the left hand forming roll with respect to the pinch rolls.

$a$-axis—rotation of the left hand forming roll about the part centerline.

$b$-axis—rotation of the left hand forming roll about the Y-axis or about a vertical axis normal to the Y-axis (the axis is illustrated as rotation about the Y-axis).

Right Hand Forming Roll

V-axis—vertical movement of the right hand forming roll along a line either parallel to the vertical centerline of the pinch rolls or inclined thereto (the axis is illustrated as inclined).

W-axis—lateral movement of the right hand forming roll with respect to the pinch rolls.

$d$-axis—rotation of the right hand forming roll about the part centerline.

$e$-axis—rotation of the right hand forming roll about the V-axis or about a vertical axis normal to the X-axis (the axis is illustrated as rotation about the V-axis).

Obviously, in the most advanced configuration of the invention, mechanical power is used to control forming roll movement about each of the axes described above. Mechanical power may be provided by hydraulic actuators of the type described above and schematically illustrated in FIG. 5, or it may be provided by electrical stepping motors, or other suitable devices. In either case, the power sources are, preferably, under closed loop control, depicted in FIG. 5, to insure accurate positioning of the forming roll along the related axis.

Depending on the size, shape and accuracy requirements of the part to be contour formed, it is possible to eliminate one or more of the axes of motion of one or more of the forming rolls. Further, in some instances, it is desirable to leave the $b$ and $e$ axes unpowered—for example, when the parts to be contour formed are of sufficient thickness to cause a caster-like rotation along these axes to the least energy position during the rolling operation. Unpowered movement along the $b$ and $e$ axes is enhanced by the use of a low friction arrangement (e.g. thrust or air bearings) located at a suitable interface. Thus, it is desirable to include such arrangements in an actual embodiment of the invention.

Movement along the linear right and left hand roll forming axes (Y,Z,V,W) is, preferably, readily accomplished using conventional side and gibbed way arrangements. Contrawise, each pair of rotation axes ($a$ and $b$, and $d$ and $e$) require an arrangement that provides two degrees of freedom about a common point. A mechanism formed in accordance with the invention for controlling movement along all illustrated axes of either the right or the left hand forming roll is illustrated in FIGS. 9–12, and hereinafter described. Prior thereto, however, it should be noted that the rotational axes of each forming roll must lay in a plane passing through the longitudinal part centerline normal to a horizontal reference plane containing the centerlines of the lower pinch roll and the forming roll shafts when the rolls are aligned. For ease of control system programming, the intersection between the two axes should be coincident with the normal location of the part centroid, as illustrated in FIG. 8 and now described.

Figures 8, 9:
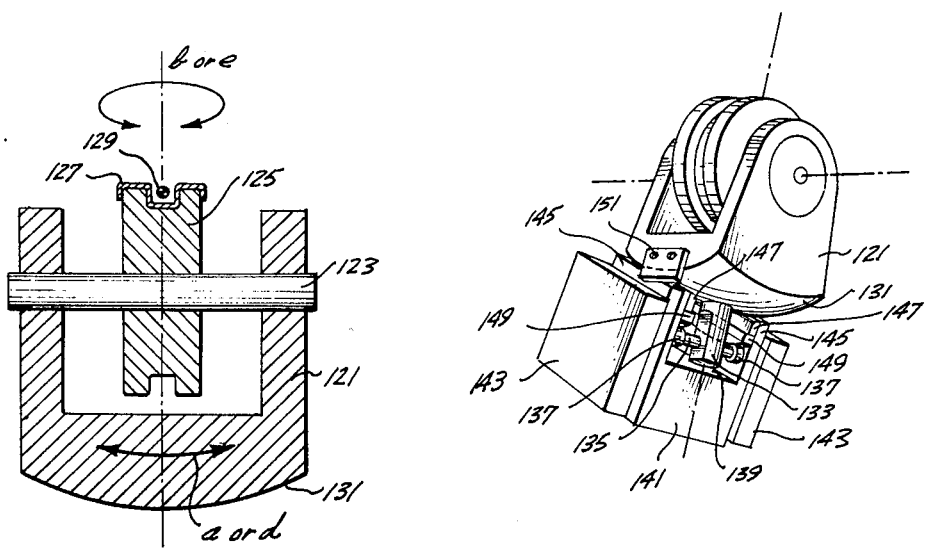
FIG. 8 is the schematic diagram illustrating the orientation of the rotary axes of movement of the forming rolls.
FIG. 9 is an isometric diagram illustrating a mechanism for positioning the left hand forming rolls.

FIG. 8 illustrates schematically a yoke 121. Mounted between the legs of the yoke 121 is a shaft 123. Rotatably mounted on the shaft 123 is a forming roll 125. (Alternatively, the shaft 123 may be mounted for rotation in the yoke 121.) In addition, a part 127 to be formed is illustrated in FIG. 8. The particular part to be formed is illustrated as a return flange hat. A return flange hat has a part centroid 129 located between the sides of its U-shaped center section. The $b$ or $e$ axis is formed about the bisecting axis (Y or V) running through the forming roll 125 and the $a$ or $d$ axis is coincident with the part centroid. The desired movement along the $a$ or $d$ axis, is achieved by making the outer surface 131 of the cross member of the yoke 121 semi-spherical and, as illustrated in FIG. 9, support it in a structure which allows movement about the part centroid at the location where it intersects the Y or V axis, as the case may be.

FIG. 9 is a pictorial diagram illustrating the yoke 121 and its semi-spherical outer surface 131 mounted in a structure that provides for movement about the part centroid at the point where it intersects the Y or V axis. Located in the center of the semi-spherical surface 131, and projecting radially outwardly therefrom, is a swivel post 133. The spherical surface is attached to the swivel post 133 in a rotatable manner whereby the yoke 121 is rotatable about the Y or V axis, i.e., in the path of travel defined by the $b$ or $e$ axis.

A shaft 135 projects orthogonally outwardly from the swivel post, on either side thereof, and supports a pair of roller cams 137 at its outer ends. The swivel post 133 and roller cams 137 are located in an aperture 139 formed in a block 141 that is movable along the W and Z axis. The block 141 is in turn supported between a pair of arms 143 movable along the V or Y axes. (It will be appreciated from the following description of FIGS. 10-12 that the block 141 and the arms 143 are merely block illustrations of the mechanism for moving the associated roller along the described axes.)

The aperture 139 in the block 141 is defined by a pair of upwardly projecting legs 145. Affixed near the tops of the inner surface of the upwardly projecting legs 145 are semi-spherical support elements 147. The upper surfaces of the semi-spherical support elements 147 have radii of curvature equal to the radius of curvature of the semi-spherical surface 131 of the yoke 121, and mate therewith. Located immediately beneath the semi-spherical support elements 147 are curved ways 149. The cam rollers on (follow) the curved ways, which have a radius of curvature equal to the radius of curvature of the semi-spherical surface 131, plus the distance separating the curved ways from the semi-spherical surfaces of the semi-spherical support elements 147. Thus, as the cam rollers follow the curvature of the curved ways 149, they cause the yoke 121 to move about its spherical surface along rotational axis $a$ or $d$. In this manner, the mechanism illustrated in FIG. 9 allows movement along the two rotational axes associated with either the right hand or the left hand forming roll. In some contouring situations, movement along the $b$ or $e$ axis may not be desired. A stop plate 151 adapted to be affixed to the yoke 121 so as to interact with the outer surface of one of the legs 145 is provided to achieve this result. The stop plate 151 prevents yoke rotation about the swivel post 133.

FIGS. 10-12 illustrate, in somewhat more detail, a powered mechanism, formed in accordance with the invention, that is suitable for moving the left hand forming roll about the Y, Z and $a$ axes. While the $b$ axis is unpowered, i.e. left free to rotate, it will be appreciated that a suitable power mechanism may be added, if desired. It also will be appreciated that a similar mechanism can be utilized to control the movement of the right hand forming roll.

FIGS. 10 and 11 illustrate a support plate 153. A pair of L-shaped supports 155 are mounted on the support plate 153 and lie along axes parallel to the Y-axis. The L-shaped supports are mounted such that they, in combination with the support plate 153, define a pair of channels that face one another. A Y-axis support block 157 is located between the L-shaped supports and includes outer projections which lie in the channels they define. A first hydraulic actuator 159 also lies between the L-shaped supports 155, generally along an axis parallel to or coincident with the Y axis. The first hydraulic actuator is attached to the support plate 153 by bolts 161. The outer end of the shaft 163 of the first hydraulic actuator 159 is attached to the Y-axis support block 157.

It will be appreciated from the foregoing description that the first hydraulic actuator 159 is adapted to move the Y-axis support block 157 in either direction along an axis parallel to or coincident with the Y-axis. As will be better understood from the following description, this movement moves the left hand forming roll along the Y-axis, since it is at all times defined as lying on that axis. Lateral alignment of the Y-axis support block is provided by the outer projections of the Y-axis support block 157 and their associated channels.

The Y-axis support block 157 includes a generally flat surface 165 lying in a plane orthogonal to the Y-axis. Projecting upwardly on either side of the flat surface 165 in parallel planes lying parallel to the Y-axis, are gibbed arms 167. The gibbed arms 167 coact with ways 171 formed in a Z-axis support block 173. The Z-axis support block 173 includes a generally flat surface 175 that is spaced from the generally flat surface 165 of the Y-axis support block 157 by a spacer 176. The location of the gibbed arms 167 and the flat surface is such that the Z-axis support block 173 is orthogonally movable with respect to the Y-axis, i.e., in the planes defined by the flat surfaces. Thus, the Z-axis support block is movable along an axis parallel to, or coincident with, the Z-axis.

Affixed by bolts 178 to the generally flat surface 165 of the Y-axis support block is a second hydraulic actuator 177. The shaft of the second hydraulic actuator 177 has its outer end affixed to the Z-axis support block 173, and is movable along an axis parallel to the Z-axis. Thus, when the second hydraulic actuator 177 is actuated, it moves the Z-axis support block 173 orthogonally with respect to the Y-axis support block 157 and along an axis parallel to, or coincident with, the Z-axis.

The upper end of the Z-axis support block 173 is generally U-shaped in cross-section (in a plane orthogonal to the Z-axis) and, thus, includes an aperture 179 best seen in FIG. 12. A swivel post 181 affixed to a yoke 183 to which the left hand forming roll 59 is rotatably attached lies in the aperture 179. The yoke 183 includes a spherical lower surface 185. The upper surfaces of the side walls 186 that define the aperture 179 are spherically formed and mate with the spherical lower surface 185 of the yoke. In addition, formed in the side walls 186 that define the aperture 179 are facing curved ways 187. As with FIG. 9, the curved ways have a radius of curvature equal to the radius of curvature of the spherical surface 185 of the yoke 183, plus the distance separating them from that surface. Affixed to the swivel post 181 is an orthogonally arrayed shaft 189 that supports cam rollers 191 on either end. The cam rollers lie in the curved ways 187. It will be appreciated that the yoke 183 is rotatable about two axes in the same manner as the yoke 121 illustrated in FIG. 9 and described above was rotatable about two axes. Since the manner of movement is the same, it will not be reiterated here. However, powered rotation about the a-axis is hereinafter described.

Powered movement about the a-axis is provided by a third hydraulic actuator 193 affixed to a flange 195 projecting outwardly from one of the side walls 186 that define the aperture 179. The outer end of the shaft 197 of the third hydraulic actuator 193 is rotatably affixed by a yoke 194 to the shaft 189 to which the swivel pin 181 is affixed rotatably. Movement of the shaft 197 of the third hydraulic actuator 193 causes the cam rollers 191 to move in the curved ways 187. This movement causes rotary movement of the yoke 181 about the X-axis. Thus, the left hand forming roll 59 is moved along the a-axis. FIG. 11 also illustrates that the left hand forming roll 59 is mounted on a shaft 200 that is supported by bearings 201 mounted in the arms of the yoke 181. The bearings allow the left hand forming roll to freely rotate with respect to the yoke 181.

It will be appreciated from the foregoing description that a mechanism suitable for providing powered movement of the left hand forming roll along the Y-Z and a axes is provided by the invention. Movement along the b axis is unpowered; however, the left hand forming roll is free to move along this axis, unless prevented from doing so by a suitable mechanism such as a locking plate 151 (FIG. 9). As noted above, a similar mechanism can be utilized to provide powered movement of the right hand forming roll about the V, W and d axes, with free movement along the e axis, if desired. In addition, if desired, a hydraulic actuator (or other mechanical mechanism) can be included to provide powered movement along the b or e axes. Further, while hydraulic actuators have been illustrated in FIGS. 10–12 and noted above, obviously other mechanisms can also be utilized. For example, electric stepping motors can be utilized, if desired. Hence, the illustrated mechanism should be considered as illustrative only, not limiting.

It has been found that some parts will move away from the forming rolls under the bending forces applied during severe twist or bow contour forming. Obviously, such separation will result in an unacceptable product being formed, because it allows uncontrollable part distortions to occur. The invention, however, provides a mechanism that is adapted to prevent such separations from occuring. This mechanism is illustrated in FIGS. 13–15 and retains the part being contour formed in contact with the forming rolls under all conditions. For purposes of clarity, only the necessary mechanism is schematically illustrated in FIG. 13. However, it will be appreciated that the other mechanisms of the invention herein described are used in combination with the separation (distortion) preventing mechanism illustrated in FIGS. 13–15. In addition, it will be appreciated that minor mechanical modifications may be necessary in order for the schematically illustrated mechanism to be made compatible with the other mechanisms of the invention.

The distortion preventing mechanism of the invention illustrated in FIGS. 13–15 comprises two actuating brackets 211, one associated with each of the right and left hand forming rolls 55 and 59. Each bracket 211 includes two spaced arms 214. One end of each of the actuating brackets is connected by a universal joint mechanism 213 to a fixed support 215. The other ends of the actuating bracket arms 214 encircle essentially one-half of a sleeve 215 (FIG. 14), which surrounds the shaft 217 supporting the associated forming roll 55, one on either side thereof. An inverted U-shaped auxiliary shoe mounting bracket 221 surrounds the forming roll 55 on the side diagonally opposed to the actuating bracket arms. The legs 219 of the shoe mounting bracket 221 include semi-circular apertures, which surround the other half of the sleeve 215 and are connected to the actuating arm 211 by bolts 223. The sleeve is rotatably mounted on the shaft 217, while the forming roll 55 is affixed thereto.

Bolts 229 attached an inwardly projecting auxiliary shoe 231 to the cross-member of the shoe mounting bracket 221. The shoe 231, for a return flange shaped part 233, is illustrated in FIG. 14. The illustrated shoe is L-shaped in cross section and includes an inwardly projecting leg 235. The leg 235 has a side that is coplanar with the main portion of the Z-shaped part and presses that portion against a co-operating surface of the forming roll 55. The tip of the inwardly projecting leg 235 lies in one outwardly projecting flange of the Z-shaped part and the other leg of the shoe 231 presses against the other outwardly projecting flange of the Z-shaped part. An edge plate 237 presses against the return flange of the outwardly projecting flange of the Z-section against which the tip of the leg 235 presses. In this manner, the shoe presses the Z-shaped part against the forming roll 219, which includes corresponding surfaces, as is well known to those skilled in the art.

The cross section of the shoe is formed so as to match the forming roll profile with an allowance for the material thickness of the section to be contour formed. Thus, the shoe 231 and the forming roll 55 define an orifice through which the part must pass. This orifice prevents the part from separating from the forming roll and distorting under bending loads. The part contacting surfaces of both the forming roll 55 and the shoe 231 are radiused longitudinally to the minimum expected part contour, as best shown in FIG. 15, so that only one portion of the shoe is tangent to the part. It is mandatory that the shoe rotate to track the tangent point between the part and the forming roll as the forming roll is traversed to produce the part. If this critical limitation is not met, a counterclockwise mislocation of the shoe-roll tangent point will tend to remove contour from the part being contour formed. Conversely, a clockwise mislocation will cause overcontouring of the part. The rotational attachment of the shoe mounting bracket and the actuating arm to the shaft via the sleeve surrounding the shaft and the universal joint allow the invention to meet this requirement.

As an alternative to the use of an articulated actuating arm to support a shoe mounting bracket, a programmable mechanical actuator could also be utilized by the invention to perform the functions illustrated in FIGS. 13–15 and described above. Also in some circumstances it may be more desirable to place the shoe between the pinch rolls and the forming rolls, as opposed to about the pinch rolls.

Figure 16:
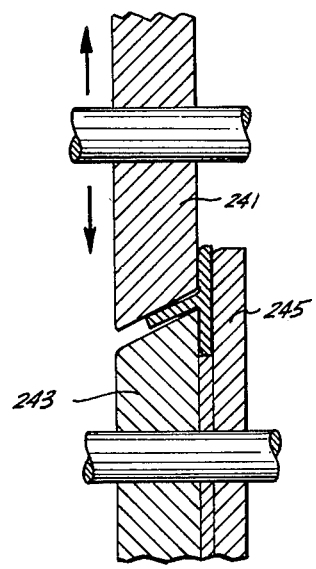
FIG. 16 is a cross-sectional view of a pair of pinch rolls that are adapted to changing the angularity of a leg of a part.

In most circumstances, the only forming required of the N/C machine will be either uniplanar or multiplanar contour forming. In some circumstances, however, it may be desirable to change the relationship of one portion of the part being contour formed with respect to other portions. For example, it may be desirable to vary the angularity of the leg of a T-shaped part while it is being contour formed. The invention provides a mechanism for accomplishing this result. The mechanism is generally illustrated in FIG. 16 and more completely illustrated in FIG. 25. In addition, FIGS. 22–24 illustrate a T-shaped part with varying leg angularity; and, FIGS. 26A–C and 27A–C illustrate pinch forming roll edge configurations for use in varying the leg angularity of L, T and Z-shaped parts, respectively.

The mechanism for changing the leg angularity of a T-shaped part, generally illustrated in FIG. 16, comprises a pair of pinch rolls 241 and 243. The pinch rolls face one another along a line that lies in a plane that intersects the rotational axes of the pinch rolls, as opposed to lying along a line that lies in a plane parallel to these axes. In other words, the region where the pinch rolls illustrated in FIG. 16 interface is inclined with respect to the plane of rotation of the pinch rolls. The pinch rolls are spaced apart in the interface region; and, the leg of the T-shaped part passes through the resultant aperture or orifice. Controlling the position of one of the pinch rolls (e.g., the upper pinch roll 241), with respect to the other pinch roll, controls the leg angularity change. For example, if the pinch rolls are moved closer to one another, the leg angularity will be changed by a greater amount that it would change if they were separated by a larger amount. In addition to the lower pinch rolls 243 including a segment adapted to co-operate with the upper pinch roll, it also includes a guide segment 245 which may or may not be rotational. The guide segment prevents the portion of the part whose angularity is not to be changed (i.e. the "top" of the T) from moving out of a reference position as leg angularity is changed.

Figures 22, 23, 24:
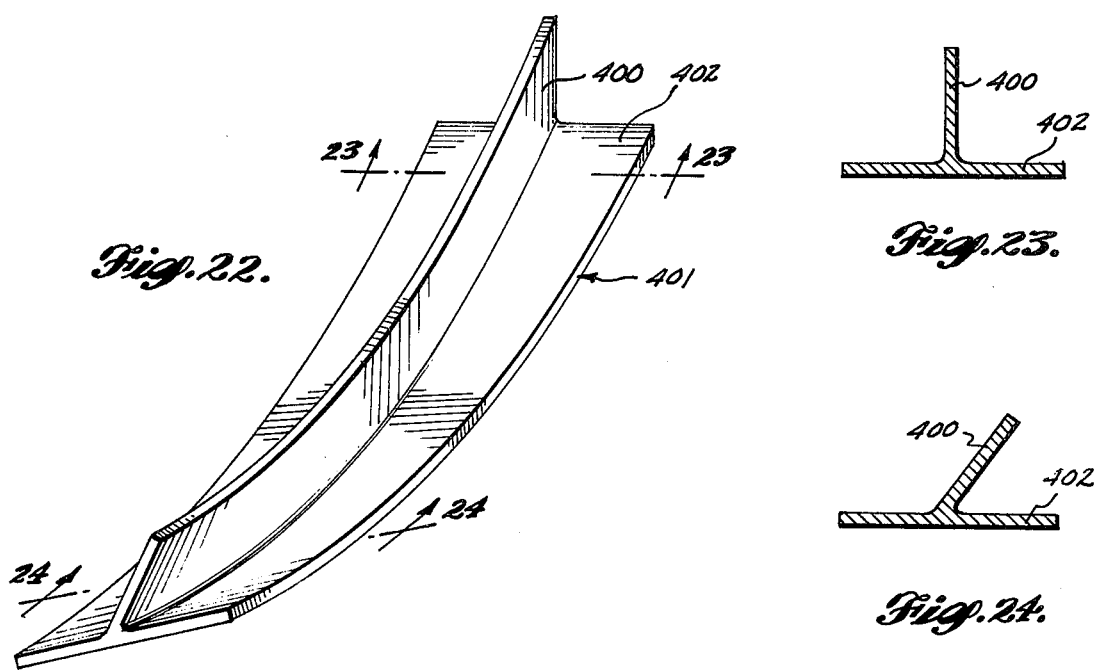
FIG. 22 is an isometric view of a T-shaped part with a variable angularity leg.
FIG. 23 is a cross-sectional view along line 23—23 of FIG. 22.
FIG. 24 is a cross-sectional view along line 24—24 of FIG. 22.

FIG. 22 illustrates a contoured part having a variable angularity leg formed by a forming machine made in accordance with the invention. Specifically, FIG. 22 illustrates a contoured, T-shaped part 401 having a variable angularity leg. More specifically, the longitudinal axis of the T-shaped part illustrated in FIG. 22 is curved in two directions, both upwardly and to the left, starting at the right edge of the drawing and moving to the left. In addition, the part is twisted and has a variable angularlity leg, e.g., the angle the leg 400 of the T makes with its head 402 varies along the longitudinal length of the part.

FIG. 23 is a cross-sectional view of the T-shaped part illustrated in FIG. 22 taken at a point where leg angularity is normal, i.e., a point where the leg 400 of the T forms an angle of 90° with respect to the head 402 of the T. FIG. 24 is a cross-sectional view taken at a point where the leg angularity is not normal, i.e., a point where the leg 400 of the T forms an acute angle with respect to one flange of the head 402 of the T and an obtuse angle with respect to the other flange.

Figure 25:
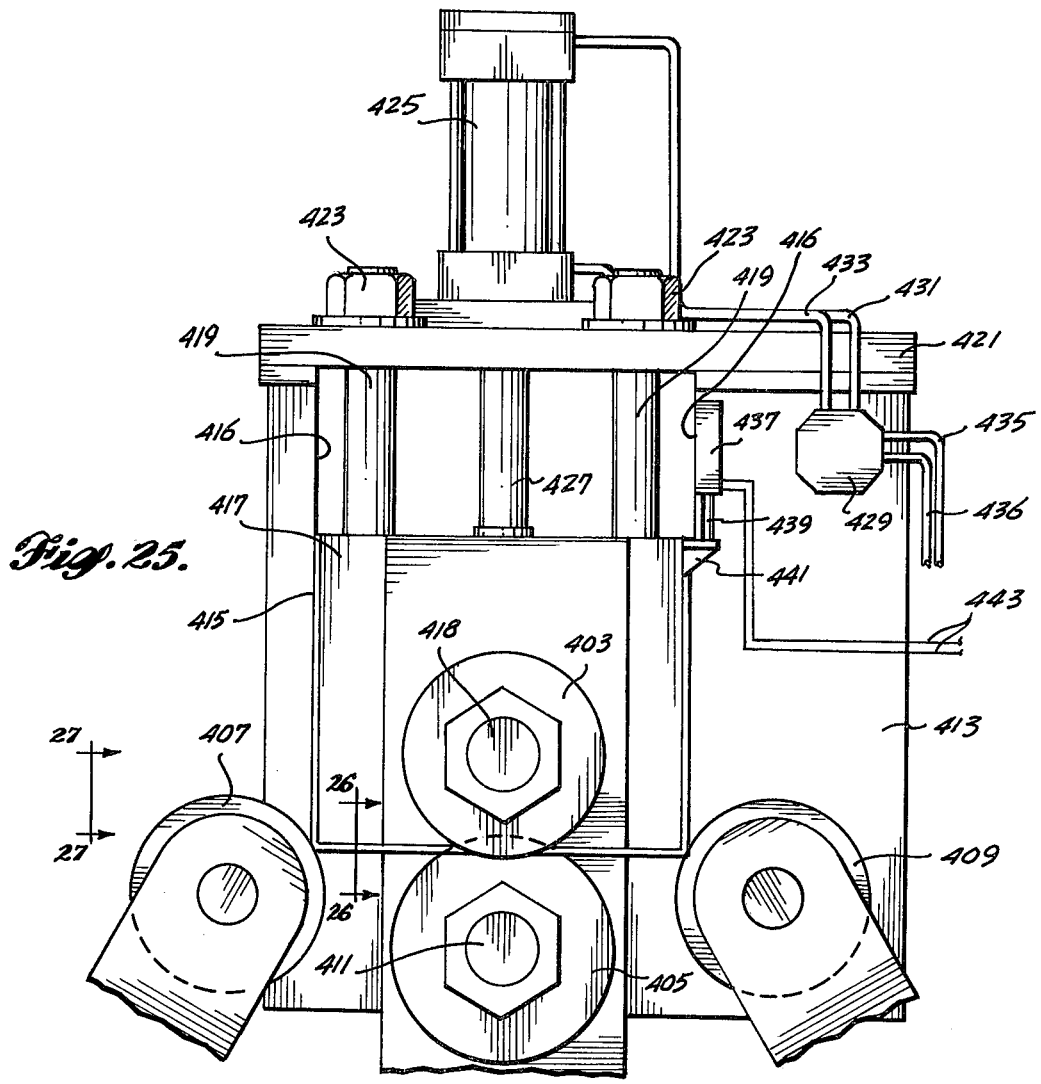
FIG. 25 is an elevational view of a mechanism for controlling the vertical position of the upper pinch roll.

FIG. 25 is an elevational view illustrating in detail a mechanism for controlling the vertical position of an upper pinch roll 403 with respect to a lower pinch roll 405. For purposes of orientation, left and right hand forming rolls 407 and 409 are schematically illustrated in FIG. 25.

The lower pinch roll 405 is keyed to a shaft 411 that is rotatably mounted ina frame 413. Formed in the frame 413 above the lower pinch roll 405 is an upper aperture 415 as defined by opposing vertical sidewalls 416. Located in the upper aperture 415 is a carriage 417.

The carriage 417 is mounted for vertical movement on a pair of vertical shafts 419 mounted in the upper aperture 415. The upper pinch roll is keyed to a shaft 418 that is rotatably mounted in the carriage 417.

Lying across the top of the aperture 415 is a plate 421. The vertical shafts 419 project through apertures in the plate 421 and are affixed in place at their upper ends by a pair of nuts 423 threaded onto the upper ends of the shafts 419. Mounted atop the plate 421 is a hydraulic actuator 425. The hydraulic actuator is mounted such that its shaft 427 is vertically arrayed. The lower end of the shaft 427 of the hydraulic actuator 425 is attached to the carriage 417 so that actuation of the hydraulic actuator, in a conventional manner, causes the carriage 417 to be raised and lowered. As the carriage is raised and lowered, the upper pinch roll 403 is raised and lowered, whereby the size of the aperture or orfice (FIG. 16) formed between the upper and lower pinch rolls 403 and 405 is varied.

A servo valve 429 is connected via conduits 431 and 433 to either end of the housing of the hydraulic actuator 425. The servo valve 429 is also connected to a suitable hydraulic source via conduits 435 and 436. In a conventional manner, control of the servo valve controls the hydraulic pressure applied to opposite sides of the piston mounted in the housing of the hydraulic actuator 25 and, thus, the position of the actuator shaft 427, the carriage 417 and the upper pinch roll 403. Servo valve control is provided by an electronic subsystem formed in the manner previously described.

Also illustrated in FIG. 25 is a linear potentiometer 437 affixed to the frame 413 adjacent one wall of the upper aperture 415. The linear potentiometer includes a shaft 439 that is vertically arrayed. The lower end of the linear potentiometer shaft 439 is connected by a coupler 441 to the carriage 417. As a result of this mechanical coupling arrangement, as the carriage 417 is raised and lowered by the action of the hydraulic actuator, the position of the shaft 439 of the linear potentiometer 437 is controlled. The position of the shaft 439, in turn, controls the resistance of the linear potentiometer, which reistance is sensed via a part of wires 443. As a result, the sensed resistance is related to the vertical position of the carriage 417 and, hence, the vertical position of the upper pinch roll 403.

In essence, the position of the upper pinch roll 403 of the mechanism illustrated in FIG. 25 is controlled in a manner similar to the manner of controlling the position of the forming rolls about their various paths of movement, as generally illustrated in FIGS. 4 and 5, and previously discussed. The primary difference, as noted above, is that "channel" that controls the upper pinch roll normally will not include the adaptive control illustrated in FIG. 5. However, regardless of whether or not an adaptive control subsystem is included, the hydraulic actuator 425 is operated in a close-loop manner to control the position of the upper roll 403, in accordance with control signals received from a control signal source 51 (FIG. 1). The manner of operation is such that as a part passes between the pinch rolls leg angularity is changed. The amount of change is determined by the vertical position of the upper pinch roll 403 with respect to the lower pinch roll. As a result, the final part is not only contoured but, if desired, also has the angularity of at least one of its legs changed. In addition to using the invention to control the angularity of a leg as a part is being contoured, obviously, the invention can also be used to merely change leg angle without contouring the part. Such a utilization of the invention is particularly desirable in situations where it is uneconomical to produce extrusion dies to form a part having the desired angularity. That is, in some instances, it may be less expensive to use the invention to change leg angularity of a standard shape than design a special extrusion die to form a part having the desired leg angularity. In other circumstances, it may be economically desirable to use the invention to change leg angularity prior to subsequent operations, such as machining or stretch forming a part.

As illustrated in FIG. 16 and briefly noted above, at least one of the pinch rolls, when the pinch rolls are being used to change leg angularity, may be formed to two or more segments. Included among the segments are guide segments adapted to define the edges of the orifice through which the part is to pass and assist in maintaining at least one cross-sectional region of the part (e.g., the cap or head of a T-shaped part) in a reference position. Other segments include forming segments adapted to control the change in leg angularity; and, transversely movable segments adapted either to assist in maintaining the part in a desired orientation or to provide a fulcrum for contour forming by the forming rolls, or to perform both functions. In addition, other segments form spacers that fill gaps between the other segments.

As will be readily recognized by those skilled in the machine tool art, leg angularity can be changed in either of two ways. The angle between a reference region or leg (e.g. head of a T-shaped part) and the leg whose position is to be changed can be increased or decreased. For purposes of discussion, pinch roll assemblies adapted to increase this angle are referred to as open angle set-ups and pinch roll assemblies adapted to decrease this angle are referred to as closed angle set-ups. Similarly, corresponding forming rolls are referred to as open angle set-ups and closed angle set-ups.

Figure 26A:
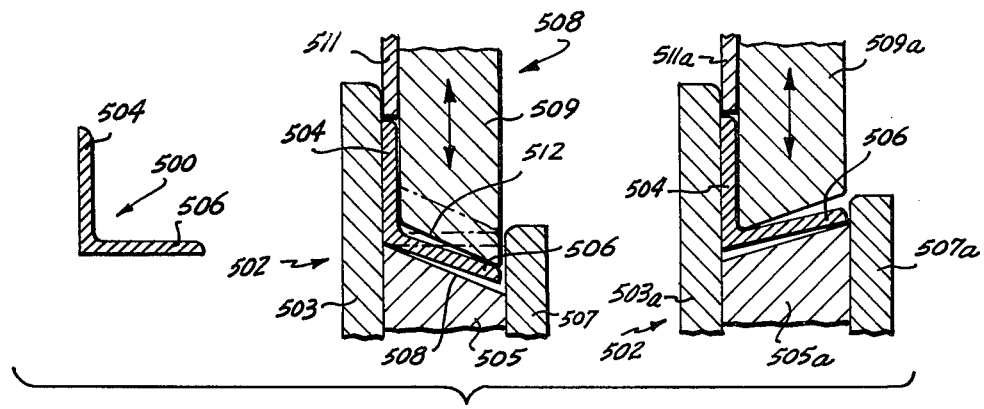
FIG. 26A is a partial, cross-sectional view of pinch rolls suitable for varying the angularity of an L-shaped part taken along line 26—26 of FIG. 25.
Figure 26B:
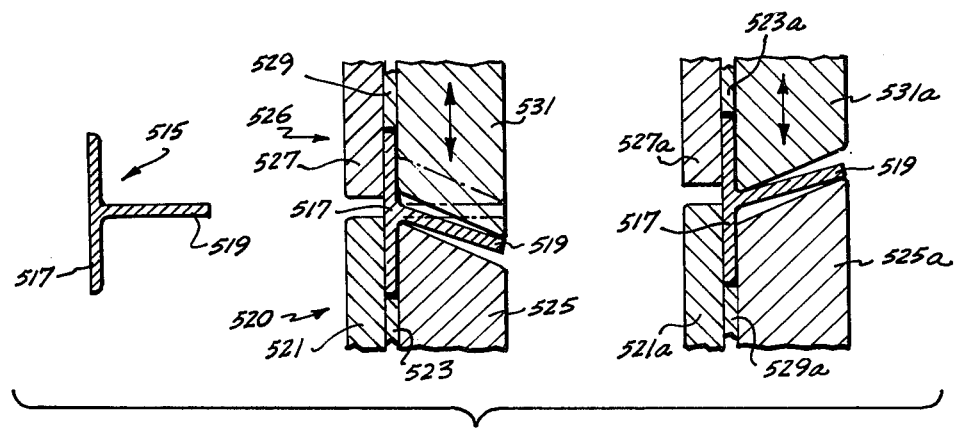
FIG. 26B is a partial, cross-sectional view of pinch rolls suitable for varying the angularity of a T-shaped part taken along line 26—26 of FIG. 25.
Figure 26C:
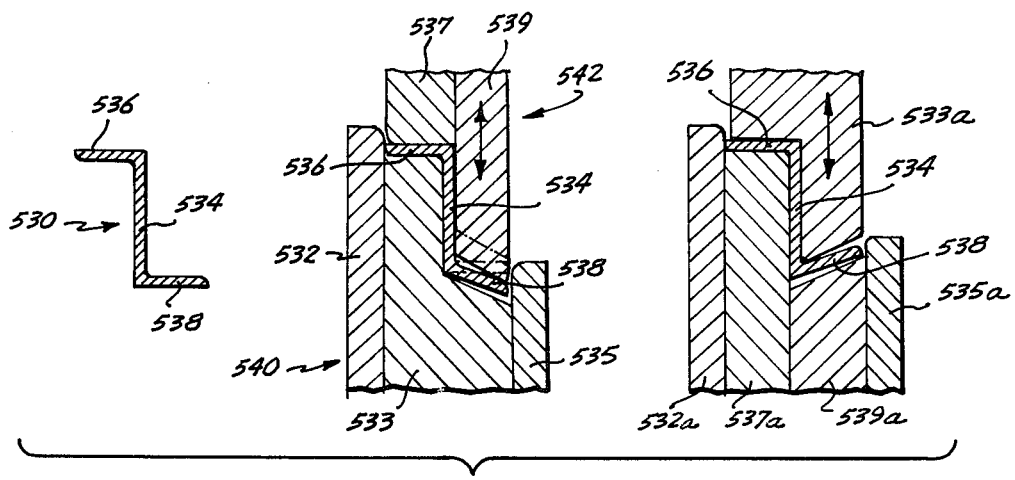
FIG. 26C is a partial, cross-sectional view of pinch rolls suitable for varying the angularity of a Z-shaped part taken along line 26—26 of FIG. 25.

FIGS. 26A-26C illustrate pinch roll assemblies for changing the leg angularity of L-shaped, T-shaped and Z-shaped parts, respectively. The prefix letter of these part shapes relates to the general cross-sectional configuration of the parts prior to the leg angularity change. For purposes of discussion, the cross-sectional configuration of the parts prior to changing leg angularity, in all cases, is right angular. That is, the L-shaped part has a 90° intersection between the two legs that define the "L," the T-shaped part has 90° angles formed between the leg of the T and the head of the T; and, the flanges of the Z-shaped part meet the main or central portion of the part at 90° angles, one flange extending outwardly from one edge on one side of the main portion and the other flange extending outwardly from the other edge, on the opposite side. Obviously, other part shapes can have their leg angularity changed by the invention. Further similar parts having non right angular leg, head or flange intersections can have their "leg" angularity changed.

FIG. 26A illustrates pinch roll assemblies, both an open angle set-up and a closed angle set-up for varying the angle between the legs of an L-shaped part 500. A silhouette of the L-shaped part is illustrated on the left side of FIG. 26A; the open angle set-up is illustrated in the middle; and, the closed angle set-up is located on the right side. The L-shaped part is oriented and passes between the pinch roll assemblies such that one leg 504 is vertical and the other leg 506 is horizontal. The pinch roll assemblies are formed such that the vertical leg 504 remains vertical and the horizontal leg 506 is bent upwardly or downwardly, depending upon whether the assembly is an open angle set-up or a closed angle set-up. The horizontal leg is depicted as pointing outwardly, i.e., toward the left or away from the frame supporting the pinch roll assemblies. For purposes of discussion, the sides of the roll segments facing the frame are referred to as the "inner" side or face and the sides facing away from the frame are referred to as the "outer" side or face.

The lower pinch roll 502 of the open angle set-up includes an inner guide segment 503, a center forming segment 505 and an outer guide segment 507. All of the segments are affixed to the lower pinch roll shaft so as to be rotatable therewith. However, none of these segments are transversely movable. The forming segment 505 is a conical frustum that converges outwardly toward the axis of rotation of the lower pinch roll. Thus, as viewed in FIG. 26A, the outer periphery 508 of the forming segment 505 converges toward the right. The forming segment 505 is generally equal in thickness to the width of the horizontal leg 506.

The inner guide segment 503 is located contiguous to the inner face of the forming segment 505 and has a diameter greater than the inner diameter of the forming segment by an amount at least equal to the length of the vertical leg of the L-shaped part. The outer guide segment 507 is located contiguous to the outer face of the forming segment 505 and has an outer diameter greater than the outer diameter of the forming segment 505 by an amount equal to the inner diameter of the forming segment 505, plus the thickness of the horizontal leg of the L-shaped part.

The upper pinch roll 508 includes a forming segment 509 and a narrow, transversely movable segment 511. The forming segment 509 of the upper pinch roll is thinner than the forming segment 505 of the lower roll by an amount equal to the width of the vertical leg of the L-shaped part. The outer periphery 512 of the upper forming segment 509 forms a surface that mates with the outer periphery 508 of the lower forming segment 505. That is, the upper forming segment 509 is a conical frustum that converges inwardly toward the axis of rotation of the upper pinch roll. The convergence is such that the outer periphery 512 of the forming segment 509 of the upper pinch roll 508 is parallel to the outer periphery 508 of the forming segment 505 of the lower pinch roll 502. Located contiguous to the inside face of the upper forming segment 509 is the narrow, transversely movable segment 511. Preferably, the transversely movable segment is formed in one of the manners hereinafter illustrated in FIGS. 28-31 and hereinafter described. The thickness of the transversely movable segment 511 is generally equal to the thickness of the vertical leg 504 of the L-shaped part 500. The diameter of the transversely movable segment when it is in its normal state is, preferably, equal to the outer diameter of the upper forming segment 509 minus an amount equal to the inside length of the vertical leg 504 of the L-shaped part.

In operation, as discussed above, the upper pinch roll 508 is vertically movable. Initially, the upper pinch roll is raised to a position such that the outer lower corner of the upper forming segment 509 is horizontally spaced above the inner upper corner of the lower forming segment 505 by an amount equal to or slightly greater than the thickness of the horizontal leg of the L-shaped part. As the L-shaped part enters the orifice between the pinch rolls, the vertical leg enters the space beneath the transversely movable segment 511, between the inner face of the upper forming segment 509 and the outer face of the inner guide segment 508. As the part moves through the pinch rolls, the vertical leg 504 remains in this position. As the part enters the pinch rolls, the horizontal leg 506 is horizontal as indicated by the dashed lines. As the part moves through the orifice between the pinch rolls, the upper pinch roll is moved downwardly toward the lower pinch rolls, whereby the mating peripheral surfaces of the forming segments bend the horizontal leg downwardly. As a result the angle between the vertical and horizontal legs is increased. The maximum increase, of course, is determined by the conical angle defined by the outer peripheries of the forming segments, minus any springback. Obviously, the maximum angle need not be reached, since the leg angularity can be changed to any intermediate angle, i.e. any angle between 90° and the maximum angle.

The closed angle set-up for an L-shaped part illustrated on the right side of FIG. 26A is substantially identical to the open angle set-up, except that the direction of inclination of the mating peripheral surfaces of the forming segments is reversed. That is, the outer periphery of the upper forming segment 509a converges outwardly, rather than inwardly, toward the axis of rotation of the upper pinch roll; and, the outer periphery of the lower forming segment 505a converges inwardly, rather than outwardly, toward the axis of rotation of the lower pinch roll. In addition, the narrow, transversely movable segment 511 is replaced by a nontransversely movable narrow, spacer 511a. The last change is made because during downward upper pinch roll movement the vertical leg 504 moves downward while the outer tip of the horizontal leg remains fixed and, thus, no transverse movement is necessary. As a result of the movement of the upper pinch roll, however, the angle between the vertical and horizontal legs decreases.

FIG. 26B illustrates pinch roll assemblies for varying the leg angularity of a T-shaped part. A silhouette of the cross-section of the T-shaped part 515 is illustrated on the left side of FIG. 26B; an open angle set-up is illustrated in the middle; and, a closed angle set-up is illustrated on the right side. As shown by the silhouette of the part, the part includes a head 517 and a leg 519. When moved through the pinch rolls, the head of the T-shaped part is vertically oriented and remains so oriented. At the start of part movement the leg is horizontally oriented and points outwardly, i.e., away from the frame. From this starting position the leg is bent downwardly or upwardly depending upon whether the set-up is an open angle set-up or a closed angle set-up.

The lower pinch roll 520 of the open angle set-up for a T-shaped part comprises: an inner guide segment 521; a spacer 523; and, a forming segment 525, all coaxially mounted on the shaft adapted to rotate the lower pinch roll. The inner guide segment 521 is located adjacent to the frame and the spacer 523 fills space between the inner guide segment and the forming segment 525. The forming segment 525 is a conical frustum that converges, outwardly, toward the axis of rotation of the lower pinch roll and is generally equal in thickness to the height of the leg 519. The inner diameter of the forming segment 525 is generally equal to the diameter of the guide sement 521. The diameter of the spacer 523 is less than the inner diameter of the forming segment 525 by an amount equal to the inner width of one of the flanges forming the head 517 of the T-shaped part 515.

The upper pinch roll 526 of the open angle set-up for changing the angularity of the leg of a T-shaped part comprises: an inner guide segment 527; a transversely movable segment 529; and, a forming segment 531, all coaxially mounted on the shaft adapted to rotate the upper pinch roll. The inner guide segment 527 of the upper pinch roll 526, is, preferably, equal in thickness to the thickness of the inner guide segment 521 of the lower pinch roll, and lies co-planar therewith. The transversely movable segment 529 is equal in thickness to the thickness of the spacer 523 and lies co-planar therewith. The forming segment 531 of the upper pinch roll 526 is, preferably, equal in thickness to the thickness of the forming segment 525 of the lower pinch roll 520 and lies co-planar therewith. The outer periphery of the upper forming segment 531 mates with the outer periphery of the lower forming segment 525. Thus, while the upper forming segment 525 is also a conical frustum, it diverges inwardly, rather than outwardly. The diameter of the inner guide segment 527 of the upper pinch roll 526 is generally equal to the inner diameter of the upper forming segment 531; and, the diameter of the transversely movable segment 529, when it is in its normal position (which is coaxial about the upper pinch roll shaft) is equal to the inner diameter of the upper forming segment, or slightly less, depending upon the inclination angle of the outer periphery of the upper forming segment.

In operation, the upper pinch roll 526 is first moved to a vertical position such that the orifice between the upper forming segment 531 and the lower forming segment 525 allows the leg 519 of the T-shaped part 515 to fit therebetween. When in this position one flange of the head 517 of the T-shaped, part 515 extends upwardly and may lie partially between the upper, inner guide segment 527 and the upper forming segment 531. Regardless of whether lying partially between these elements or not, this flange lies beneath the transversely movable segment 529. The other or lower head flange lies between the lower, inner guide segment 521 and the lower forming segment 525, above the spacer 523. As the part moves through this orfice, as a result of the application of rotary power to the pinch rolls, the upper pinch roll 526 is moved downwardly and bends the leg downwardly so as to increase the angle between the leg and the flange of the head 517 extending upwardly. Conversely, the angle between the leg and the flange of the head extendingdownwardly is decreased.

The closed angle set-up for a T-shaped part is generally similar to the open angle set-up, except that the spacer 523a is located between the upper, inner guide segment 527a and the upper forming segment 531a; and, the transversely movable segment 529a is located between the lower inner guide segment 521a and the lower forming segment 525a. In addition, the mating outer peripheries of the upper and lower forming segments 531a and 525a incline in the opposite direction. As a result of these changes, the leg 519 is bent upwardly, rather then downwardly.

FIG. 26C illustrates pinch roll assemblies for changing the angularity of one of the flanges of a Z-shaped part 530 with respect to the main or mid section of the part. A silhouette of the cross-sectional configuration of a Z-shaped part is illustrated on the left side of FIG. 26C; an open angle set-up is illustrated in the middle; and, a closed angle set-up is illustrated on the right side.

The illustrated Z-shaped part 530 includes a planar main or mid region 534; and, a pair of flanges 536 and 538. The flanges extend orthogonally outwardly from opposite sides of the mid region 534 along opposing edges thereof. When the Z-shaped part is moved between the pinch roll assemblies, its mid region lies in a vertical plane. Thus, the flanges, prior to any angularity change occurring lie in horizontal planes such that one flange 536 forms an upper flange and the other flange 538 forms a lower flange. In the described embodiment of the invention, the lower flange (leg) has its angularity changed and the upper flange (leg) remains in a fixed position. If desired, alternate roll segment arrangements can be provided such that the angularity of the upper flange (leg) and/or both flanges (legs) are changed as the Z-shaped part is moved through the pinch roll assemblies.

The lower pinch roll 540 of the open angle set-up comprises: an inner guide segment 532; a forming segment 533; and, an outer guide segment 535, all mounted on the lower pinch roll shaft. The inner and outer guide segments 532 and 535 are located on opposite sides of the forming segment 533. Neither the inner or outer guide segments 532 and 535, or the forming segment 533, are transversely movable.

The outer periphery of the forming segment 533 includes a step that matches the step in the Z-shaped part. That is, the step includes a vertical "riser" having a height equal to the height of the mid region 534 of the Z-shaped part 530. The upper "tread" of the step lies parallel to the axis of rotation of the lower pinch roll and is equal in width to the inner width of the upper flange 536 of the Z-shaped part. The lower "tread" of the step is a conical frustum that converges, outwardly, toward the axis of rotation of the lower pinch roll 540. The overall thickness of the upper forming segment 533 is generally equal to the overall width of the Z-shaped part 515. The diameter of the inner guide segement 532 is greater than the inner diameter of the lower forming segment by an amount at least equal to the thickness of the upper flange 536. The diameter of the outer guide segment 535 is greater than the inner diameter of the lower tread by an amount at least equal to the thickness of the lower flange 538.

The upper pinch roll 542 of the open angle set-up comprises a transversely movable segment 537; and, a forming segment 539. The thickness of the transversely movable segment 537 is equal to the outer width of the upper leg 536 of the Z-shaped part 530 and is located in line with the upper tread of the lower forming segment 533. The inner face of the upper forming segment 539 is contiguous to the outer face of the transversely movable segment 539 and is equal in thickness to the horizontal width of the lower tread minus an amount equal to the thickness of the mid region 534 of the Z-shaped part 530. The outer periphery of the upper forming segment 539 mates with the lower tread and, thus, is a conical frustum that diverges, inwardly, toward the axis of rotation of the upper pinch roll. The "normal" diameter of the transversely movable segment 537 is less than the outer diameter of the upper forming segment 539 by an amount equal to the height of mid region 534 minus the thickness of the lower flange 538.

In operation, the upper pinch roll is initially moved to a vertical position such that the gap between the outer periphery of the upper forming segment 539 and the lower tread of the lower forming segment 533 is adequate to allow the lower flange 538, when horizontally disposed to pass therebetween. Thereafter, the upper pinch roll is moved downwardly, causing the forming segments to bend the lower flange 538 downwardly. As a result, the angle between the lower flange or leg 538 and the mid region 538 increased. As the upper pinch roll moves downwardly the transversely movable segment 537 moves upwardly, i.e., transversely with respect to the axis of rotation of the upper pinch roll, such that the fulcrum necessary for the forming rolls to bend the part is maintained.

The closed angle set-up for a Z-shaped part reverses the positions of the upper and lower forming segments. More specifically, the upper forming roll includes a stepped forming segment 533a; and, the lower forming roll includes a transversely movable segment 537a and a forming segment located between inner and outer guide segments 532a and 535a. In addition, the lower step of the now upper guide segment is a conical frustum that converges, outwardly, toward the axis of rotation of the upper pinch roll. Further, the "normal" diameter of the transversely movable segment 537a is larger than the outer diameter of the forming segment 539a by an amount equal to the height of the mid region 534.

It will be appreciated from the foregoing discussion that, in essence, the upper and lower pinch roll assemblies are all formed such that a variable height orifice is located about a leg or flange whose angularity is to be changed with respect to another leg, flange or region of the part. The other leg, flange or region forms a reference part section that remains fixed in a vertical plane; and, the horizontal position of a leg is changed by rotating the horizontal leg about the point where it meets the vertical or reference leg. Thus, the angle between the vertical leg and the horizontal leg is changed. The pinch roll assemblies are all formed such that the outer peripheries of upper and lower forming segments are inclined with respect to the axes of rotation of the upper and lower pinch rolls. The outward direction of inclination, in the open angle set-ups is toward the axis of rotation of the lower pinch roll. In the closed angle set-ups, the outward direction of inclination is toward the axis of rotation of the upper pinch roll. Obviously, the specifically illustrated cross-sectional configurations can be changed, as desired. As necessary, transversely movable segments are provided to maintain the vertical or reference leg in a fixed position as the upper pinch roll moves downwardly and, also as necessary, to provide a fulcrum for contour forming of the part by the forming rolls. While only pinch roll assemblies suitable for changing the angularity of a single leg of L, T and Z-shaped parts have been illustrated and described, it is to be understood that the legs of parts having other shapes can also have their angularity changed by apparatus formed in accordance with the invention. It should also be understood that two legs (e.g., the upper and lower flanges of a Z-shaped part) can have their leg angularity changed simultaneously. Also the change can cover only a part of a leg, i.e., a "dog leg" can be formed from a planar leg.

Figure 27A:
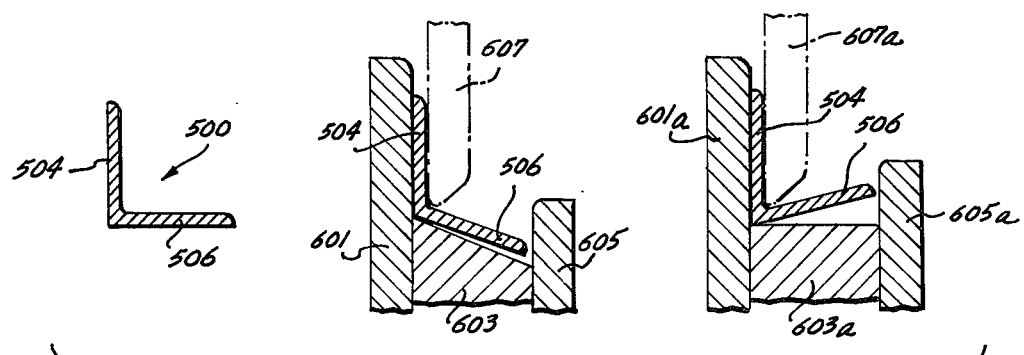
FIG. 27A is a partial, cross-sectional view of forming rolls suitable for use when the angularity of an L-shaped part is varied by the pinch rolls illustrated in FIG. 26A, taken along line 27—27 of FIG. 25.
Figure 27B:
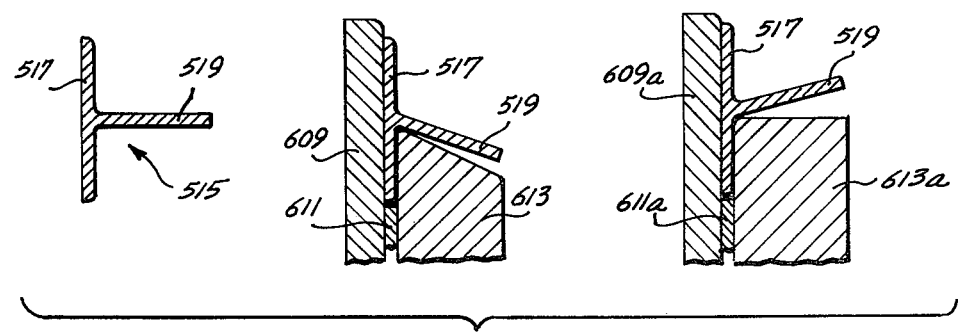
FIG. 27B is a partial, cross-sectional view of forming rolls suitable for use when the angularity of a T-shaped part is varied by the pinch rolls illustrated in FIG. 26B, taken along line 27—27 of FIG. 25.
Figure 27C:
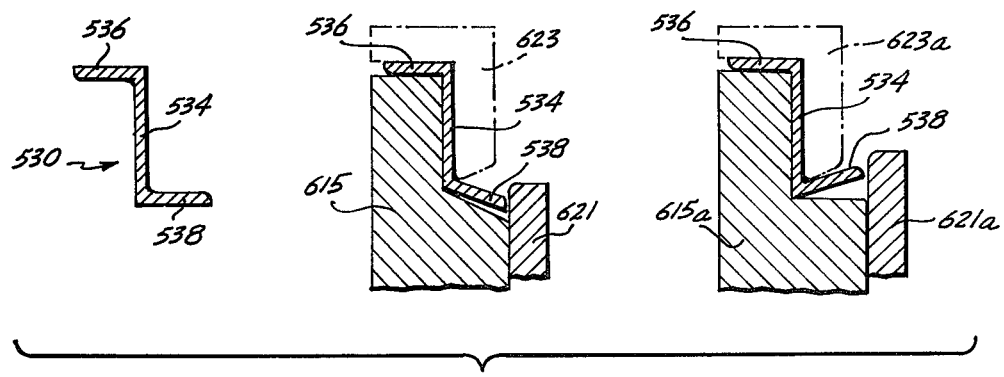
FIG. 27C is a partial cross-sectional view of forming rolls suitable for use when the angularity of a Z-shaped part is varied by the pinch rolls illustrated in FIG. 26C, taken along line 27—27 of FIG. 25.

FIGS. 27A-C illustrate the cross-sectional configuration of output forming rolls useful in combination with the leg angularity changing pinch roll assemblies illustrated in FIGS. 26A-C, respectively. In general, for open angle set-ups, the cross-sectional configuration of these output forming rolls (e.g. the forming rolls on the output end of the contour forming mechanism) is the same as the cross-sectional configuration of the lower pinch roll to which they relate. In closed angle set-ups, the cross-sectional configuration is also generally the same, except that the area of the output forming roll related to the forming segment of the lower pinch roll has an outer periphery that lies parallel to the axis of rotation of the forming roll, rather than inclined thereto. As necessary, auxiliary shoes of the type illustrated in FIGS. 13-15 and generally described as above are provided to maintain, in general, the portions of the parts whose angularity has not been changed (e.g., the reference legs, flanges or regions) in a fixed position with respect to related regions of the output forming roll.

The output forming roll for L-shaped parts 500 having a leg angularity change created by an open angle set-up comprises: an inner guide section 601; a mid section 603; and an outer guide section 605. The mid section has an outer periphery corresponding to the outer periphery of the forming segment 505 of the lower pinch roll of the open angle set-up for L-shaped parts. Thus, the mid section 603 is a conical frustum that, outwardly, converges toward the axis of rotation of the output forming roll. The inner and outer guide sections lie on either side of the mid section and have a diameter greater than the diameter of the adjacent face of the mid section. An auxiliary shoe 607, if necessary, is mounted so as to ride against the outer face of the vertical leg 504 of the L-shaped part 500. The cross-sectional configuration of the output forming roll (e.g., the left forming roll 407 illustrated in FIG. 25) for the closed angle set-up for varying the leg angularity of an L-shaped part is identical to the open angle set-up, except that the mid section 603a is not a conical frustum; rather, it has an outer peripheral surface that lies parallel to the axis of rotation of the forming roll.

The cross-sectional configuration of the output forming roll for an open angle set-up for changing the angle of a leg of a T-shaped part is also similar to the cross-sectional configuration of the lower pinch roll. More specifically, the output forming roll for the open angle set-up for changing the angle of the horizontal leg of a T-shaped part illustrated in FIG. 27B comprises: an inner guide section 609; a spacer 611; and, an outer section 613. The outer face of the inner guide section 609 lies against the vertical face or "top" of the head of the T-shaped part. The spacer 611 lies below the downwardly projecting flange of the head and the inner face of the outer section 613 lies against the other side of the downwardly projecting head flange. The periphery of the outer section is a conical frustum that converges, outwardly, toward the axis of rotation of the output forming roll. The output forming roll for the closed angle set-up is identical to the output forming roll for the open angle set-up except that the outer periphery of the outer section 613a is parallel to the axis of rotation of the output forming roll. Since, in both cases, the downwardly projecting flange of the head, in essence, is gripped between the inner guide section and outer section 609 and 613, or 609a and 613a, in mose circumstances, no auxiliary shoe is necessary. Thus, one is not illustrated in FIG. 27B.

FIG. 27C illustrates output forming roll configurations for use with pinch rolls adapted to change the angularity of a horizontal, outwardly projecting leg of a Z-shaped part. The cross-sectional configuration of an output forming roll for an open angle set-up comprises an inner section 615; and, an outer guide section 621. While the lower pinch roll of the open angle set-up, illustrated in FIG. 26C, included an inner guide segment, in most instances, the inclusion of a corresponding inner guide section in the output forming roll is unnecessary. The inner section 615 is stepped in the same manner as the forming segment 533 of the lower pinch roll of FIG. 26C. Thus, the inner section includes a horizontal upper step, a riser and a lower step having a conical frustum form that converges, outwardly, toward the axis of rotation of the output forming roll. The outer guide section 621 has a diameter slightly larger than the outer diameter of the inner section 615. Also illustrated in FIG. 27C is an auxiliary shoe 623. The auxiliary shoe 623 has an inverted L-shaped configuration and is formed and positioned so as to ride on the upper surface of the upper flange 536 of the Z-shaped part and against the outer face of the mid region 534. The cross-sectional configuration of the outer forming roll for the closed angle set-up illustrated in FIG. 27C is similar to the cross-sectional configuration of the outer forming roll for the open angle set-up, except that the outer periphery of the lower step is parallel to the axis of rotation of the forming roll.

As discussed above, with respect to FIGS. 26A-C, selected segments of the upper and lower pinch rolls are transversely movable, depending upon the cross-sectional configuration of the part having its leg angularity varied or changed. FIG. 28, in general, illustrates such transverse movement in more detail and includes an upper pinch roll comprising a forming segment 701, which is not transversely movable, and a transversely movable segment 703. In FIG. 28 the transversely movable segment 703 has been illustrated in a deflected position. Both the forming segment 701 and the transversely movable segment 703 are mounted on a pinch roll shaft 705 so as to be rotated by the shaft. The transversely movable segment includes a cylindrical outer ring 707 and a cylindrical inner ring 709. The inner and outer rings are formed of a suitably strong material, such as steel. Located between the inner and outer rings is a compressible material or mechanism 711, which may take the forms illustrated in FIGS. 29 and 30 and hereinafter described. The inner ring 709 is affixed to the shaft 705 and the compressible material or mechanism 711 attaches the inner ring 709 to the outer ring 707.

When a suitable force, created by the outer ring pressing against a part and illustrated schematically by the vertical arrow 713, is radially applied to the outer ring 707, the outer ring 707 compresses the compressible material or mechanism 711 and moves radially toward the inner ring 709. What happens when such a force is applied is that the portion of the compressible material or mechanism 711, instantaneously located between the outer ring 707 and the inner ring 709, as they rotate, compresses. While, the pinch roll rotates, the physical part of the compressible material or mechanism changes; but, as long as a radial force of adequate level is applied, the transversely movable segment remains in a position such that its geometric center is offset from its axis of rotation.

FIG. 29 illustrates one form of a transversely movable segment formed in accordance with the invention. More specifically, FIG. 29 illustrates an outer ring 707a, a compressible medium 711a and an inner ring 709a. The inner ring includes a keyway 715 formed in a cylindrical aperture. The keyway allows the inner rim to be keyed to the pinch roll shaft, on which the transversely movable segment is to be mounted for rotation therewith. Except for a series of appropriately spaced relief apertures 717, the compressible medium 711a fills the entire region between the inner and outer rings. Various types of compressible materials may be used, depending on the amount of compression force to be applied. A compressible polyurethane may be used, for example.

FIG. 30 illustrates an alternate form of a transversely movable segment made in accordance with the invention. The transversely movable segment illustrated in FIG. 30 comprises an outer ring 707b, an inner ring 709b and a compressible mechanism 711b. The compressible mechanism 711b comprises a plurality of coil springs 719 that extend radially between the inner ring 709b and the outer ring 707b.

It will be appreciated that when a radial force is applied to the outer ring of either of the transversely movable segments illustrated in FIGS. 29 and 30, the force causes the outer ring to move in a radial direction toward the inner ring. Thus, the action illustrated in FIG. 28 and discussed above occurs.

FIG. 31 illustrates a further alternate form of a transversely movable segment made in accordance with the invention. The transversely movable segment illustrated in FIG. 31 comprises a rim 801, formed of a compressible material, affixed to the outer periphery of a solid (non compressible) hub 803. The hub 803 is adapted to be mounted for rotation on a pinch roll shaft. In operation, a part 805 pressing against the outer surface of the transversely movable segment creates a force that causes the compressible rim 801 to compress and, thus, a transverse movement occurs. While the overall transversely movable segment does not transversely move, the compressible segment functions to provide transverse movement in the sense that the geometric center of the transversely movable segment becomes offset from its axis of rotation. The transverely movable segment illustrated in FIG. 31 may be more preferred in environments where only a slight amount of transverse movement is required. Contrariwise, the transversely movable segments illustrated in FIGS. 29 and 30 may be more preferred in environments where larger amounts of transverse movement are required.

In addition to being used to change leg angularity, control of the pinch rollers can be used to provide another benefit. This benefit is illustrated in FIGS. 32 and 33 and hereinafter described. Specifically, FIG. 32 illustrates a vertically movable upper pinch roll 901 and a lower pinch roll 903, both mounted for rotation. While the lower pinch roll is vertically fixed in position, it will be appreciated that the functions of the upper and lower pinch rolls, could be reversed, i.e., the upper pinch roll could be vertically fixed in position, and the lower pinch roll mounted for vertical movement. In any event, when a part is to be severely contoured, i.e., its radius of curvature is relatively sharp, considering the cross-sectional size of the part, a relatively large compression stress occurs along the upper periphery of the part and a relatively large tension stress occurs along the lower periphery of the part. Controlling the position of the upper pinch roll can be used to relieve these stresses, to some degree. This result is accomplished by controlling the vertical position of the upper pinch roll such that outer horizontal legs of the part are vertically thinned as the part moves through the pinch rolls, as illustrated in FIG. 33. Thinning the part in this region results in the compression and tension stresses being relieved.

As noted above, the contour sensor 61 (FIG. 1) may be a multiplanar or a uniplanar contour sensor. Since a suitable multiplanar sensor is fully described in U.S. Pat. No. 3,854,215, referenced above, and incorporated herein by reference, such a sensor will not be described in detail here. However, a suitable uniplanar sensor is hereinafter described.

Figure 17:
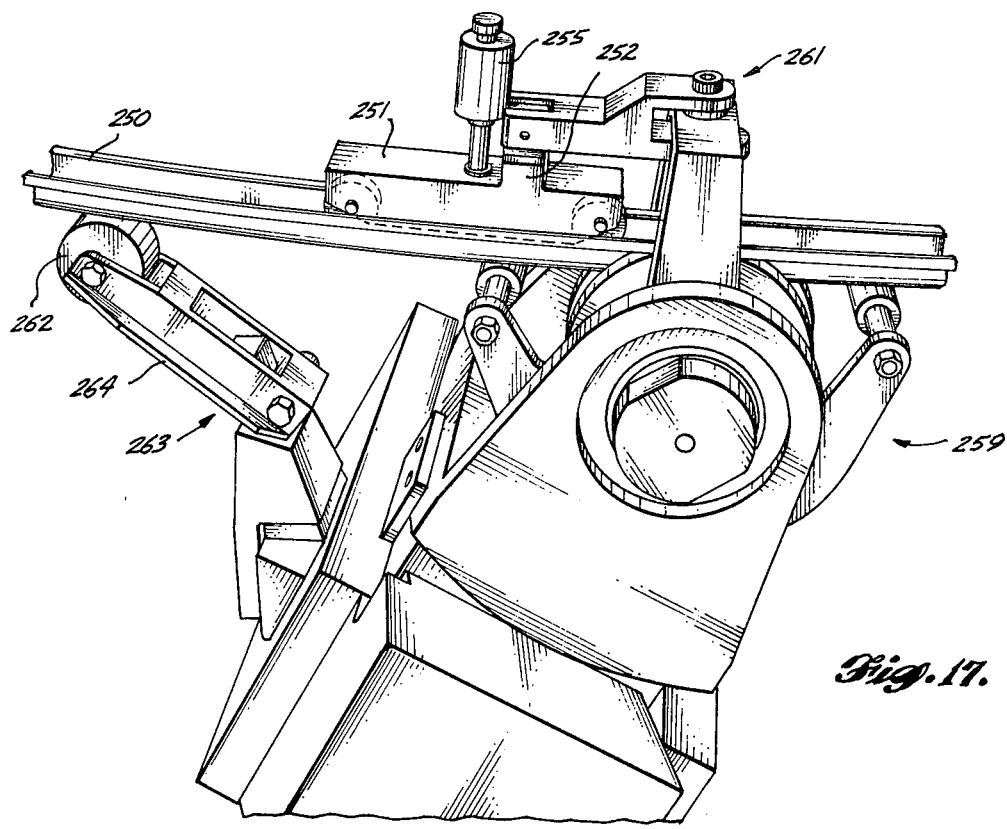
FIG. 17 is a perspective view of an uniplanar sensor, and the mechanism for supporting the sensor and the piece to be contour formed in the region of the sensor.
Figure 18:
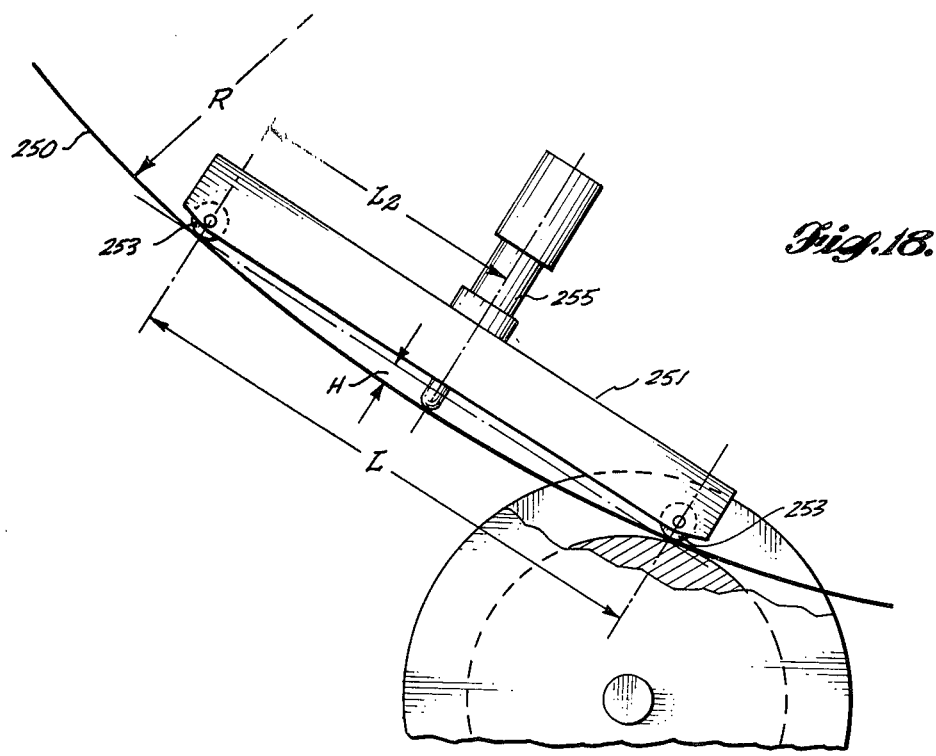
FIG. 18 is a schematic view illustrating the various dimensional relationships of a uniplanar sensor of the type illustrated in FIG. 17.
Figures 19, 20, 21:
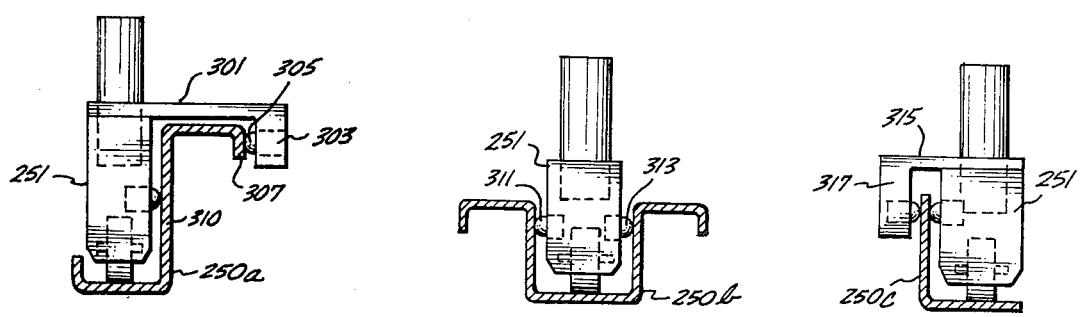
FIG. 19 is a cross-sectional view of a uniplanar sensor suitable for use when the part to be contour formed in Z-shaped in cross section.
FIG. 20 is a cross-sectional view of a uniplanar sensor suitable for use when the part to be contour formed has a reverse flange hat cross-sectional configuration.
FIG. 21 is a cross-sectional view of a uniplanar sensor suitable for use when the part to be contour formed has a right angle cross-sectional configuration.

FIGS. 17 and 18 illustrate a uniplanar sensor formed in accordance with the invention and FIGS. 19-21 illustrate cross-sectional configurations of such a sensor. These configurations are useful with parts of differing cross-sectional configurations to prevent the lateral movement of the sensor. The uniplanar sensor illustrated in the figures comprises an elongated sensor body 251 which may be formed of an aluminum bar machined to fit inside the section to be contour formed, as illustrated in FIGS. 19-21. A small roller 253 is attached to the lower corner of each end of the sensor body so that the body is free to ride on the part 250 without damaging the surface finish thereof. The rollers are separated by a predetermined span, 10 inches, for example, which establishes a chord length L. Mounted in the exact center of the sensor body is a linear variable differential transformer (LVDT) 255. The probe of the LVDT is located orthogonal to the chord length L and intersects the midpoint of the part immediately between the rollers. A suitable spring (not shown) forces the probe against the part and a suitable limiting mechanism prevents the probe from leaving the linear variable differential transformer when the sensor is not in use.

The signal from the linear variable differential transformer is related to part radius by the following equation:

$$R = (4H^2 + L^2)/8H$$

wherein:
$H$ = the arc length of the chord joining the rollers;
$L$ = the chord length; and,
$R$ = the contour radius.

It is to be noted that the span of the sensor body does not necessarily need to be 10 inches. A longer span will result in improved sensitivity; but, at a loss (increase) in transportation lag, and vice versa for a shorted span. In other words, there is a tradeoff between transportation lag and sensitivity.

FIG. 17 also illustrates a tangent point locating assembly 259 and a sensor support structure 261. Since these structures are similar to related structures illustrated and described in U.S. Pat. No. 3,854,215, referenced above and incorporated herein by reference, they will not be discussed here, except to note that their inclusion is necessary to accurately locate the uniplanar sensor with respect to a reference point (tangent locating assembly 259) and to prevent the uniplanar sensor from unduly distorting the emerging part (sensor support strcture 261). With respect to the sensor support structure, that structure is rotatably connected to the sensor body 251 via an inverted T-shaped arm 252 which may be contiguously formed with the sensor body. In addition to these mechanism, FIG. 17 also illustrates a downstream part support mechanism 263. The downstream part support mechanism 263 comprises a roller 262 mounted on the end of an arm 264. The arm is located beyond the output (left) forming roll and is spring loaded so as to press the roller 262 against the lower surface of the part. Alternatively, the arm could be fixed in place. In any event, the downstream part support mechanism assists the sensor support structure in preventing the sensor weight from distorting the emerging part.

While the uniplanar sensor illustrated in FIGS. 17 and 18 provides an adequate indication of contour radius, it may provide a distorted output if it is not laterally positioned by a suitable mechanism. Such a mechanism is illustrated in FIGS. 19, 20 and 21 for parts having different cross-sectional configurations. In general, lateral positioning is accomplished by providing spring loaded pads that press against opposing surfaces of the part to be contour formed.

FIG. 19 illustrates a lateral positioning mechanism for a part 250a having a Z-shaped cross-section that comprises an arm 301 attached to the sensor body 251. The arm extends orthogonally outwardly form the sensor body and a downward projection 303. A first spring loaded aligning pad 305 is located in the downward projection 303 and presses against a return flange of the part 250a. A second spring loaded pad 309 extends outwardly from the sensor body 251 and presses against the main portion 310 of the part. Because the spring loaded pads press against the part in opposing directions, which directions lie orthogonal to the principal axis of the elongated sensor body, they maintain the sensor body in its lateral position.

FIG. 20 illustrates a lateral positioning mechanism suitable for use with a part having a return flange hat cross-sectional configuration. In this case, a pair of spring loaded pads 311 and 313 merely extend outwardly from opposite sides of the sensor body 251. Since the spring loaded pads project outwardly in opposite directions, they impinge on the opposing sides of the hat and maintain the sensor body laterally aligned.

FIG. 21 illustrates a lateral positioning mechanism suitable for use when the part to be contour formed is angle or L-shaped. In this mechanism, an arm 315 having a downward projection 317 extends orthogonally outwardly from the sensor body 251. The arm supports a first spring loaded pad 319 located on one side of the upwardly projecting flange of the angle. A second spring loaded pad 321 projects outwardly from the sensor body 251, on the opposite side of the upwardly projecting flange of the angle. The spring loaded pads press against the flange in opposite directions and, thus, maintain the sensor body laterally aligned. Obviously, other lateral positioning mechanisms can be used by the invention, dependent upon the specific cross-sectional configuration of the part to be contour formed. Moreover, a series of arms (if needed) and aligned pairs of spring loaded pads can be located along the length of the sensor body, not just a single pair, if desired.

It will be appreciated from the foregoing description of preferred embodiments that the invention provides a pair of position controllable forming rolls located on opposite sides of pinch rolls. Including the positioning of the pinch rolls, nine controlled axes suitable for roll forming three-dimensional part contours are provided. Either single or multiple passes may be made through the system to generate the desired contour.

With respect to multiple passes, this procedure is best performed, particularly for severe compound contours, by reversing directions using all four axes of each forming roll in alternating fashion. Thus, during the first pass in one direction, one forming roll assumes the position necessary to create a desired three-dimensional part pre-form, while the other forming roll remains in line with the pinch rolls. In the second pass, in the opposite direction, the first roll retraces its motion in a coordinated fashion with part travel (to avoid distorting the part), while the second roll creates a second part preformed. This back and forth sequence, with increasing roll offset at each pass, is continued until the final part configuration is achieved.

The invention increases the utility of roll forming machines by using them to create three-dimensional contours. The end result is an improvement in the general operating efficiency and versatility of these machines. In this regard, in the past, forming rolls utilized in roll forming have usually only been manually adjustable along one (vertical) axis of motion. In some cases, one or two additional axes of motion, manually adjustable through a very limited range, may be provided to aid an operator in removing twist and bow from a part. While this arrangement has been suitable for producing parts contoured in a single plane, it has a variety of disadvantages. The invention overcomes these difficulties. In addition, the invention greatly expands the capability of such machines.

In its most advanced configuration, the invention allows control over a multitude of axes. However, a lesser number of control axes can be utilized, if desired.

The pinch rolls as well as the forming rolls can be hydraulically actuated using a regulated pressure level, for example. In situations where leg angularity or part thickness is not to be changed, normally, an adjustable travel stop is employed to set the gap between the pinch rolls making it equivalent to the thickness of the material to be contour formed. However, when it is desirable to run parts of varying thickness, the travel stop can be backed off, and the pressure system pressure reduced to the point where the force exerted on the material by the pinch rolls is insufficient to exceed the compressive strength of the material. This adjustment will cause the one pinch roll to track the thickness profile of the part as it is being formed. The compressive strength of the part material will be sufficient to force this roll away from the other roll when part thickness increases. But, the roll force must be adequate to restrain the part against the bending force applied by the forming roll to prevent inaccurate operation. Hydraulic actuation of the pinch rolls also allows the pinch rolls to be brought under closed loop control. Thus, pinch roll spacing can be placed under numerical control for positive control of the roll gap, which is of particular importance when rolling extremely soft materials. In addition, such a control can be used to vary leg angularity or part thickness, as described above.

In addition to the features discussed above, preferably, the zero position of each axis can be moved anywhere throughout the range of movement along the axis. This result is accomplished by applying a biasing signal (floating zero input — FIG. 2) to the summing junction 100. The biasing signal merely raises or lowers the junction voltage to a level related to the desired zero position for the related axis. This feature and the ratio control signal feature may be used separately or in combination to empirically compensate for elastic recovery (springback) in the formed part. Such compensation is provided by overbending the part to a degree such that, when it relaxes after leaving the forming roll, it achieves the desired contour. In summary, thus, springback compensation is empirically accomplished in three general ways (zero bias, ratio control or both) depending on what type of empirical springback data is available for adding overbend allowances to the axis commands. Yet another way is to develop spring back data in the form of charts, tables, graphs, etc. for each axis. This data should describe part contour parameters in terms of radii or twist angles. A data set should be developed for each material, thickness and part cross-section. This empirically developed data will allow individual axis commands to be modified during tape programming to include varying degrees of overbend according to the material and part configuration. The end result will be parts that are contour formed very close to the desired shape. However this arrangement lacks the precision possible through use of the adaptive control system.

In summary, if the part is being over contoured, the amount of overbend contained in the control signal source (e.g., magnetic tape) may be reduced by shifting the zero position of the axes or by adjusting the ratio control to a setting less than one so that a smaller axis offset is produced for a given command. Conversely, if the part is being overbent, either the axis zero position can be shifted or the ratio control setting increased to a factor larger than one so that greater axis offset results from a given axis command. Generally, the zero shift method is preferred when springback data is included in the program and the resulting part is close to the desired configuration. When springback data is not included in the tape program, a large correction factor (300–400%) may be required and the ratio control is best suited to accomplish the insertion of such correction faction. Any deviation that still exists due to lot-to-lot variations in material properties is eliminated by the adaptive control signal modifying command signal. Thus, desired quality levels are maintained.

While a preferred embodiment of the invention has been illustrated and described, various changes can be made therein without departing from the spirit and scope of the invention. Some of these changes are briefly discussed above. In addition, it should be noted, that while linear variable differential transformers have been discussed as the type of detectors utilized by both the uniplanar and the multiplanar sensors, other types of position detectors can be used. For example, the position of a particular part may be measured in terms of XYZ coordinates using linear probes operating from fixed reference points, proximity detectors, light beams and the like. Hence, the invention can be practiced otherwise than as specifically described herein.

The embodiments of the invention in which exclusive property or privilege is claimed are defined as follows:

1. A pinch and roll forming assembly for a roll forming machine suitable for contour forming elongate parts, said pinch and roll forming assembly comprising:
   (A) rotatable pinch roll means for moving an elongate part to be contour formed past at least one position adjustable forming roll, said direction of movement lying generally along the longitudinal centerline of said elongate part;
   (B) at least one rotatable position adjustable forming roll; and,
   (C) support and positioning means for rotatably supporting said at least one rotatable position adjustable forming roll and positioning said at least one position adjustable forming roll along:
   (1) a first longitudinal axis spaced from and lying generally parallel to the axis of rotation of said rotatable pinch roll means;
   (2) a second longitudinal axis lying orthogonal to said first axis and generally orthogonal to the path of movement of said part being contour formed; and,
   (3) a first rotational axis, said first rotational axis being about the path of movement of said part.

2. A pinch and roll forming assembly as claimed in claim 1 wherein said at least one position adjustable forming roll is also position adjustable along a second rotational axis, said second rotational axis being about said second longitudinal axis.

3. A pinch and roll forming assembly for a roll forming machine as claimed in claim 2 including:
   first power means for position adjusting said at least one position adjustable forming roll along at least one of said first and second longitudinal axes; and,
   second power means for position adjusting said at least one position adjustable forming roll along at least one of said first and second rotational axes.

4. A pinch and roll forming assembly as claimed in claim 1 wherein said rotatable pinch roll means comprises a pair of pinch rolls positioned adjacent to one another and adapted to move an elongate part by impinging on opposing sides of said part, one of said pinch rolls being mounted for movement toward and away from the other of said pinch rolls along an axis lying generally transverse to the path of travel along which said elongate part is moved.

5. A pinch and roll forming assembly as claimed in claim 4 wherein a variable size orifice is formed between said pair of pinch rolls, said orifice being formed such that movement of said movable pinch roll toward said other pinch roll as a part passes through said orifice changes the angle between two legs of said part.

6. A pinch and roll forming assembly as claimed in claim 5 wherein each of said pinch rolls of said pair of pinch rolls is formed of segments, at least one of said segments being transversely movable with respect to the axis of rotation of the pinch roll it forms a part of.

7. A pinch and roll forming assembly as claimed in claim 5 wherein said angle between said two legs of said part is increased.

8. A pinch and roll forming assembly as claimed in claim 5 wherein said angle between said two legs of said part is decreased.

9. A pinch and roll forming assembly for a roll forming machine comprising:
   (1) a pair of pinch rolls for moving a part to be contour formed past a position adjustable forming roll;
   (2) a first position adjustable forming roll; and,
   (3) a positioning means for position adjusting said first position adjustable forming roll, said positioning means comprising:
      (a) a first yoke having a semi-spherical outer surface, said position adjustable forming roll being rotationally mounted between the legs of said yoke;
      (b) a first yoke support mounted so as to support said yoke in a manner such that said yoke is movable along at least one arc defined by said semi-spherical outer surface;
      (c) first rotational positioning means connected to said yoke for moving said yoke along said at least one arc defined by said semi-spherical outer surface; and,
      (d) first longitudinal positioning means connected to said yoke support for moving said yoke support and said yoke along at least one longitudinal axis.

10. A pinch and roll forming assembly as claimed in claim 9, including:
(1) a second position adjustable forming roll, said first and second position adjustable forming rolls mounted on either side of said pair of pinch rolls; and,
(2) a second positioning means for position adjusting said second position adjustable forming roll, said second position adjusting means comprising:
(a) a second yoke having a semi-spherical outer surface, said position adjustable forming roll being rotationally mounted between the legs of said yoke;
(b) a second yoke support mounted so as to support said yoke in a manner such that said yoke is movable along at least one arc defined by said semi-spherical outer surface;
(c) second rotational positioning means connected to said yoke for moving said yoke along said at least one arc defined by said semi-spherical outer surface; and,
(d) second longitudinal positioning means connected to said yoke support for moving said yoke support and said yoke along at least one longitudinal axis.

11. A pinch and roll forming assembly for a roll forming machine as claimed in claim 10 wherein:
said first position adjustable forming roll is defined as a left hand forming roll and said second position adjustable forming roll is defined as a right hand forming roll;
the axis along which the part centerline moves when the right and left hand forming rolls are in line with the pinch rolls is defined as the X-axis;
the left hand forming roll is position adjustable along Y, Z, a and b axes, said axes defined as:
Y-axis—movement of the left hand forming roll along a line transverse to the X-axis;
Z-axis — lateral movement of the left hand forming roll with respect to the pinch rolls;
a-axis — rotation of the left hand forming roll about the part centerline; and,
b-axis — rotation of the left hand forming roll about the Y-axis; and,
the right hand roll is position adjustable along V, W, d and e axes, said axes defined as:
V-axis — movement of the right hand forming roll along a line transverse to the X-axis;
W-axis — lateral movement of the right hand forming roll with respect to the pinch rolls;
d-axis — rotation of the right hand forming roll about the part centerline; and,
e-axis — rotation of the right hand forming roll about the V-axis.

12. A pinch and roll forming an assembly for a roll forming machine as claimed in claim 11 wherein: said first longitudinal positioning means positions said left hand forming roll along one of said Y and Z axes; said first rotational positioning means positions said left hand forming roll along one of said a and b axes; said second longitudinal positioning means positions said right hand forming roll along one of said V and W axes; and, said second rotational positioning means positions said right hand forming roll along one of said d and e axes.

13. A pinch and roll forming assembly for a roll forming machine as claimed in claim 12 wherein:
said first longitudinal positioning means positions said left hand forming roll along both of said Y and Z axes; and,
said second longitudinal positioning means positions said right hand forming roll along both of said V and W axes.

14. A pinch and roll forming assembly for a roll forming machine as claimed in claim 13 wherein said movement of said yokes by said longitudinal and rotational positioning means is created by hydraulic actuators forming part of said longitudinal and rotational positioning means.

15. A pinch and roll forming assembly for a roll forming machine as claimed in claim 14 including a shoe associated with each forming roll, said shoes mounted so as to be tangent to their associated forming rolls and create an orifice through which the part to be contour formed is adapted to pass.

16. A pinch and roll forming assembly for a roll forming machine as claimed in claim 15 wherein said pair of pinch rolls are position adjustable along an axis transverse to said X-axis; and, including means for position adjusting said pinch rolls along said axis transverse to said X-axis.

17. A pinch and roll forming assembly as claimed in claim 9 wherein said pair of pinch rolls are positioned adjacent to one another and adapted to move an elongate part by impinging on opposing sides of said part, one of said pinch rolls being mounted for movement toward and away from the other of said pinch rolls along an axis lying generally transverse to the path of travel along which said elongate part is moved.

18. A pinch and roll forming assembly as claimed in claim 17 wherein a variable size orifice is formed between said pair of pinch rolls, said orifice being formed such that movement of said movable pinch roll toward said other pinch roll as a part passes through said orifice changes the angle between two legs of said part.

19. A pinch and roll forming assembly as claimed in claim 18 wherein each of said pinch rolls of said pair of pinch rolls is formed of segments, at least one of said segments being transversely movable with respect to the axis of rotation of the pinch roll it forms a part of.

20. A pinch and roll forming assembly as claimed in claim 18 wherein said angle between said two legs of said part is increased.

21. A pinch and roll forming assembly as claimed in claim 18 wherein said angle between said two legs of said part is decreased.

22. In a pinch and roll forming assembly suitable for contour forming parts by changing the position of one or more forming rolls with respect to the position of a pair of rotatable pinch rolls adapted to impinge on opposite sides of, and thereby move, the part to be contour formed past said one or more forming rolls, the improvement comprising:
moving means for moving one of said pair of pinch rolls laterally with respect to the other of said pair of pinch rolls whereby the distance between said pair of pinch rolls is made variable; and,
forming the adjacent peripheral regions of said pair of pinch rolls such that an orifice is formed between said pair of pinch rolls, said orifice having an axis inclined to said axis of rotation of said pinch rolls and formed such that the size of said orifice perpendicular to said inclined axis changes as said moving means moves said at least one pinch roll toward or away from the other of said pair of pinch rolls, the inclination of said orifice being such that the angle a leg of a part lying generally parallel to the axes of rotation of said pinch rolls makes with a leg lying generally orthogonal to said axes of rotation will change as said part moves through said orifice and said movable pinch roll is moved toward said other pinch roll.

23. The improvement claimed in claim 22 wherein at least one of said pinch rolls is formed of a plurality of segments, at least one of said segments being transversely movable.

24. The improvement claimed in claim 23 wherein said transversely movable segment comprises an inner ring, an outer ring and a compressible material located between said inner and outer rings.

25. The improvement claimed in claim 23 wherein said transversely movable segment comprises an inner ring, an outer ring and a compressible mechanical mechanism mounted between said inner and outer rings.

26. The improvement claimed in claim 25 wherein said compressible mechanical mechanism comprises a plurality of coil springs radially located between said inner ring and said outer ring.

27. The improvement claimed in claim 23 wherein said transversely movable segment comprises a generally non-compressible hub and a ring of compressible material mounted about the outer periphery of said generally non-compressible hub.

28. A pinch roll assembly for use in a roll forming machine to change leg angularity, said pinch roll assembly comprising:
a first shaft;
a first pinch roll mounted on said first shaft so as to be rotated by said first shaft;
a second shaft;
a second pinch roll mounted on said second shaft, said second pinch roll including a forming segment and a transversely movable segment both mounted on said second shaft so as to be rotatable by said second shaft;
said first and second pinch rolls having adjacent peripheral regions formed such that an orifice is located between said pair of pinch rolls where said forming segment of said second pinch roll faces said first pinch roll, said orifice having an axis inclined to the axis of rotation of said pinch rolls and formed such that the size of said orifice perpendicular to said inclined axis is determined by the lateral position of said first pinch roll with respect to said second pinch roll, the inclination of said orifice being such that the angle a leg of a part lying generally parallel to the axes of rotation of said pinch roll makes with a leg lying generally orthogonal to said axes of rotation will change as said part moves through said orifice and one of said pinch rolls is moved laterally toward the other pinch roll; and,
moving means connected to one of said first and second shafts for moving said one of said first and second shafts and the related one of said first and second pinch rolls laterally toward the other of said first and second shafts so as to control the size of said orifice perpendicular to said inclined axis.

29. A pinch roll assembly as claimed in claim 28 wherein said transversely movable segment comprises an inner ring, an outer ring and a compressible material located between said inner and outer rings.

30. A pinch roll assembly as claimed in claim 28 wherein said transversely movable segment comprises an inner ring, an outer ring and a compressible mechanical mechanism mounted between said inner and outer rings.

31. A pinch roll assembly as claimed in claim 30 wherein said compressible mechanical mechanism comprises a plurality of coil springs radially located between said inner ring and said outer ring.

32. A pinch roll assembly as claimed in claim 28 wherein said transversely movable segment comprises a generally non-compressible hub and a ring of compressible material mounted about the outer periphery of said generally non-compressible hub.

* * * * *

UNITED STATES PATENT AND TRADEMARK OFFICE
CERTIFICATE OF CORRECTION

PATENT NO. : 4,080,815
DATED : March 28, 1978
INVENTOR(S) : Gene B. Foster

It is certified that error appears in the above-identified patent and that said Letters Patent are hereby corrected as shown below:

Col. 2, line 9, delete "usefulnes" and insert —usefulness—;

line 12, delete "in" and insert —is—.

Col. 3, line 27, delete "This" and insert —Thus—.

Col. 4, line 20, delete "in" and insert —is—.

Col. 8, line 9, delete "If is printed" and insert —It is pointed—;

line 10, delete "pre-programed" and insert —pre-programmed—;

Col. 8, line 15, delete "andis" and insert —and is—.

Col. 9, line 37, delete "by" and insert —be—;

Col. 9, line 40, delete the equation in its entirety and insert therefor:

$$k = k_0 + \left[ \frac{q_0}{q_1} - 1 \right]$$

Col. 9, line 59, delete the equation after "memory" and insert therefor:

$$\left[ \frac{q_0}{q_1} - 1 \right]$$

Col. 9, line 63, delete "Ky" and insert —KY—.

UNITED STATES PATENT AND TRADEMARK OFFICE
CERTIFICATE OF CORRECTION

PATENT NO. : 4,080,815
DATED : March 28, 1978
INVENTOR(S) : Gene B. Foster

It is certified that error appears in the above-identified patent and that said Letters Patent are hereby corrected as shown below:

Col. 13, line 49, after "rollers" insert —roll—.

Col. 17, line 65, delete "ina" and insert —in a—.

Col. 21, line 67, delete "sement" and insert —segment—.

Col. 22, line 50, delete "extendingdownwardly" and insert —extending downwardly—.

Col. 23, line 38, delete "segement" and insert —segment—.

Col. 24, line 5, delete "538" and insert —534—.

Col. 28, line 60, delete "mechanism" and insert —mechanisms—.

Col. 29, line 15, delete "form" and insert —from—.

Signed and Sealed this

Fifteenth Day of August 1978

[SEAL]

Attest:

RUTH C. MASON
Attesting Officer

DONALD W. BANNER
Commissioner of Patents and Trademarks